US007312882B2

(12) United States Patent
Hino et al.

(10) Patent No.: US 7,312,882 B2
(45) Date of Patent: Dec. 25, 2007

(54) IMAGE PROCESSING APPARATUS, MANAGEMENT UNIT FOR IMAGE FORMING APPARATUS, AND PROGRAM EXECUTED BY IMAGE PROCESSING APPARATUS OR BY MANAGEMENT UNIT FOR IMAGE FORMING APPARATUS

(75) Inventors: Hideki Hino, Toyokawa (JP); Atsushi Tomita, Toyohashi (JP); Hideo Mae, Toyokawa (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 900 days.

(21) Appl. No.: 10/202,169

(22) Filed: Jul. 25, 2002

(65) Prior Publication Data

US 2003/0025927 A1 Feb. 6, 2003

(30) Foreign Application Priority Data

Aug. 2, 2001 (JP) ............................ 2001-235503

(51) Int. Cl.
*B41B 1/00* (2006.01)
(52) U.S. Cl. ................. 358/1.13; 358/1.15; 358/402; 358/1.13; 717/171; 717/176; 709/242; 709/246; 709/206; 709/223; 713/1
(58) Field of Classification Search ................ 358/1.1, 358/1.14, 1.13, 1.15, 402; 717/171, 168, 717/176; 709/220, 223, 242, 246, 206; 713/2, 713/1; 710/100, 15; 702/188
See application file for complete search history.

(56) References Cited

U.S. PATENT DOCUMENTS

| 5,970,224 A | 10/1999 | Salgado et al. | |
|---|---|---|---|
| 5,987,494 A * | 11/1999 | Ouchi | .......................... 718/107 |
| 6,320,667 B1 * | 11/2001 | Mitsuhashi | .................. 358/1.1 |
| 6,467,087 B1 * | 10/2002 | Yang | ........................... 717/168 |
| 6,698,949 B2 * | 3/2004 | Yoshioka et al. | ............. 400/61 |
| 6,735,641 B1 * | 5/2004 | Kobayashi et al. | ........... 710/15 |
| 6,930,785 B1 * | 8/2005 | Weyand et al. | ............... 358/1.1 |
| 6,990,659 B1 * | 1/2006 | Imai | ........................... 717/171 |
| 2002/0052718 A1 * | 5/2002 | Little et al. | .................. 702/188 |

(Continued)

FOREIGN PATENT DOCUMENTS

JP          9-91129          4/1997

(Continued)

*Primary Examiner*—King Y. Poon
*Assistant Examiner*—Ashis K. Thomas
(74) *Attorney, Agent, or Firm*—Buchanan Ingersoll & Rooney PC

(57) ABSTRACT

An image processing apparatus includes a memory storing firmware, a reception unit for receiving an image processing job, an image processing job execution controller for executing the image processing job using the firmware, a firmware reception unit for receiving firmware for rewrite purpose distributed from an external device, a firmware rewrite controller for executing a firmware rewrite job of rewriting the firmware stored in the memory to the received firmware, a judgment unit for judging a type of the received firmware, and a job management controller for adjusting an execution order of the image processing job and the firmware rewrite job according to the type of the received firmware, and instructing to execute the image processing job and the firmware rewrite job in the adjusted execution order when the image processing job and the firmware rewrite job are both placed in a wait state for execution.

16 Claims, 30 Drawing Sheets

U.S. PATENT DOCUMENTS

| | | | |
|---|---|---|---|
| 2002/0073304 A1* | 6/2002 | Marsh et al. | 713/1 |
| 2002/0091585 A1* | 7/2002 | Asauchi et al. | 705/26 |
| 2002/0143924 A1* | 10/2002 | Iga | 709/223 |
| 2002/0144005 A1* | 10/2002 | Mae et al. | 709/310 |
| 2003/0020938 A1* | 1/2003 | Terada et al. | 358/1.13 |
| 2003/0035139 A1* | 2/2003 | Tomita et al. | 358/1.15 |
| 2003/0053112 A1* | 3/2003 | Motosugi et al. | 358/1.14 |
| 2003/0063305 A1* | 4/2003 | McIntyre | 358/1.13 |
| 2003/0086107 A1* | 5/2003 | Johnson et al. | 358/1.13 |
| 2003/0086122 A1* | 5/2003 | Parry | 358/402 |
| 2003/0217254 A1* | 11/2003 | Page et al. | 713/2 |
| 2004/0117464 A1* | 6/2004 | Mae et al. | 709/220 |
| 2005/0005047 A1* | 1/2005 | Keeney et al. | 710/100 |

FOREIGN PATENT DOCUMENTS

| | | |
|---|---|---|
| JP | 2001-047697 | 2/2001 |
| JP | 2001-56753 A | 2/2001 |

* cited by examiner

FIG.5

| No. | MODEL | E-MAIL ADDRESS | OTHER INFORMATION... | |
|---|---|---|---|---|
| 1 | model 1 | device1@customerA.com | ... | |
| 2 | model 3 | device2@customerA.com | ... | |
| 3 | model 3 | device3@customerB.com | ... | |
| ⋮ | ⋮ | ⋮ | ⋮ | |

FIG.8A

| JOB NUMBER | JOB TYPE | ADDITIONAL INFORMATION | ADDRESS |
|---|---|---|---|
| 1 | 1 (PRINT JOB) |  | 0x1000 |
| 2 | 1 (PRINT JOB) |  | 0x2000 |
| 3 | 2 (FIRMWARE REWRITE JOB) | 1(CONTROL MODULE1).DAT | 0x3000 |
| 4 | 1 (PRINT JOB) |  | 0x4000 |
| 5 | 2 (FIRMWARE REWRITE JOB) | 1(CONTROL MODULE1).PRG | 0x3000 |
| ⋮ | ⋮ | ⋮ | ⋮ |

FIG.8B

| JOB NUMBER | JOB TYPE | ADDITIONAL INFORMATION | ADDRESS |
|---|---|---|---|
| 1 | 1 (PRINT JOB) |  | 0x1000 |
| 2 | 1 (PRINT JOB) |  | 0x2000 |
| 3 | 2 (FIRMWARE REWRITE JOB) | 1(CONTROL MODULE1).DAT | 0x3000 |
| 4 | 1 (PRINT JOB) |  | 0x4000 |
| 5 | 2 (FIRMWARE REWRITE JOB) | 1(CONTROL MODULE1).PRG | 0x3000 |
| 6 | 1 (PRINT JOB) |  | 0x5000 |
| ⋮ | ⋮ | ⋮ | ⋮ |

FIG.8C

| JOB NUMBER | JOB TYPE | ADDITIONAL INFORMATION | ADDRESS |
|---|---|---|---|
| 1 | 1 (PRINT JOB) |  | 0x1000 |
| 2 | 1 (PRINT JOB) |  | 0x2000 |
| 3 | 2 (FIRMWARE REWRITE JOB) | 1(CONTROL MODULE1).DAT | 0x3000 |
| 4 | 1 (PRINT JOB) |  | 0x4000 |
| 5 | 1 (PRINT JOB) |  | 0x5000 |
| 6 | 2 (FIRMWARE REWRITE JOB) | 1(CONTROL MODULE1).PRG | 0x3000 |
| ⋮ | ⋮ | ⋮ | ⋮ |

FIG.20A

| JOB NUMBER | JOB TYPE | ADDITIONAL INFORMATION | ADDRESS |
|---|---|---|---|
| 1 | 1 (PRINT JOB) | | 0x1000 |
| 2 | 1 (PRINT JOB) | | 0x2000 |
| 3 | 2 (FIRMWARE REWRITE JOB) | 1(CONTROL MODULE1) | 0x3000 |
| 4 | 1 (PRINT JOB) | | 0x4000 |
| 5 | 3 (SCAN JOB) | 3(CONTROL MODULE3) | 0x5000 |
| 6 | 2 (FIRMWARE REWRITE JOB) | | 0x6000 |
| ⋮ | ⋮ | ⋮ | ⋮ |

FIG.20B

| JOB NUMBER | JOB TYPE | ADDITIONAL INFORMATION | ADDRESS |
|---|---|---|---|
| 1 | 2 (FIRMWARE REWRITE JOB) | 1(CONTROL MODULE1) | 0x3000 |
| 2 | 1 (PRINT JOB) | | 0x4000 |
| 3 | 3 (SCAN JOB) | 1(CONTROL MODULE1).DAT | 0x5000 |
| 4 | | | |
| ⋮ | ⋮ | ⋮ | ⋮ |

FIG.28A

| JOB NUMBER | JOB TYPE | ADDITIONAL INFORMATION | SENT | ADDRESS |
|---|---|---|---|---|
| 1 | 1 (PRINT JOB) | | | 0x1000 |
| 2 | 1 (PRINT JOB) | | | 0x2000 |
| 3 | 2 (FIRMWARE REWRITE JOB) | 1(CONTROL MODULE1)1/4 | | 0x3000 |
| 4 | 1 (PRINT JOB) | | | 0x4000 |
| 5 | 3 (SCAN JOB) | | | 0x5000 |
| 6 | 2 (FIRMWARE REWRITE JOB) | 2(CONTROL MODULE2)2/4 | | 0x6000 |
| ⋮ | ⋮ | ⋮ | | ⋮ |

FIG.28B

| JOB NUMBER | JOB TYPE | ADDITIONAL INFORMATION | SENT | ADDRESS |
|---|---|---|---|---|
| 1 | 2 (FIRMWARE REWRITE JOB) | 1(CONTROL MODULE1)1/4 | ○ | 0x3000 |
| 2 | 1 (PRINT JOB) | | | 0x4000 |
| 3 | 3 (SCAN JOB) | | | 0x5000 |
| 4 | 2 (FIRMWARE REWRITE JOB) | 2(CONTROL MODULE2)2/4 | ○ | 0x6000 |
| 5 | 1 (PRINT JOB) | | | 0x7000 |
| 6 | 2 (FIRMWARE REWRITE JOB) | 3(CONTROL MODULE3)4/4 | ○ | 0x8000 |
| 7 | 1 (PRINT JOB) | | | 0x9000 |
| 8 | 3 (SCAN JOB) | | | 0x10000 |
| 9 | 2 (FIRMWARE REWRITE JOB) | 4(CONTROL MODULE)3/4 | ○ | 0x11000 |
| 10 | 1 (PRINT JOB) | | | 0x12000 |

FIG.28C

| JOB NUMBER | JOB TYPE | ADDITIONAL INFORMATION | SENT | ADDRESS |
|---|---|---|---|---|
| 1 | 1 (PRINT JOB) | | | 0x4000 |
| 2 | 3 (SCAN JOB) | | | 0x5000 |
| 3 | 1 (PRINT JOB) | | | 0x7000 |
| 4 | 1 (PRINT JOB) | | | 0x9000 |
| 5 | 3 (SCAN JOB) | | | 0x10000 |
| 6 | 1 (PRINT JOB) | | | 0x12000 |
| ⋮ | ⋮ | ⋮ | | ⋮ |

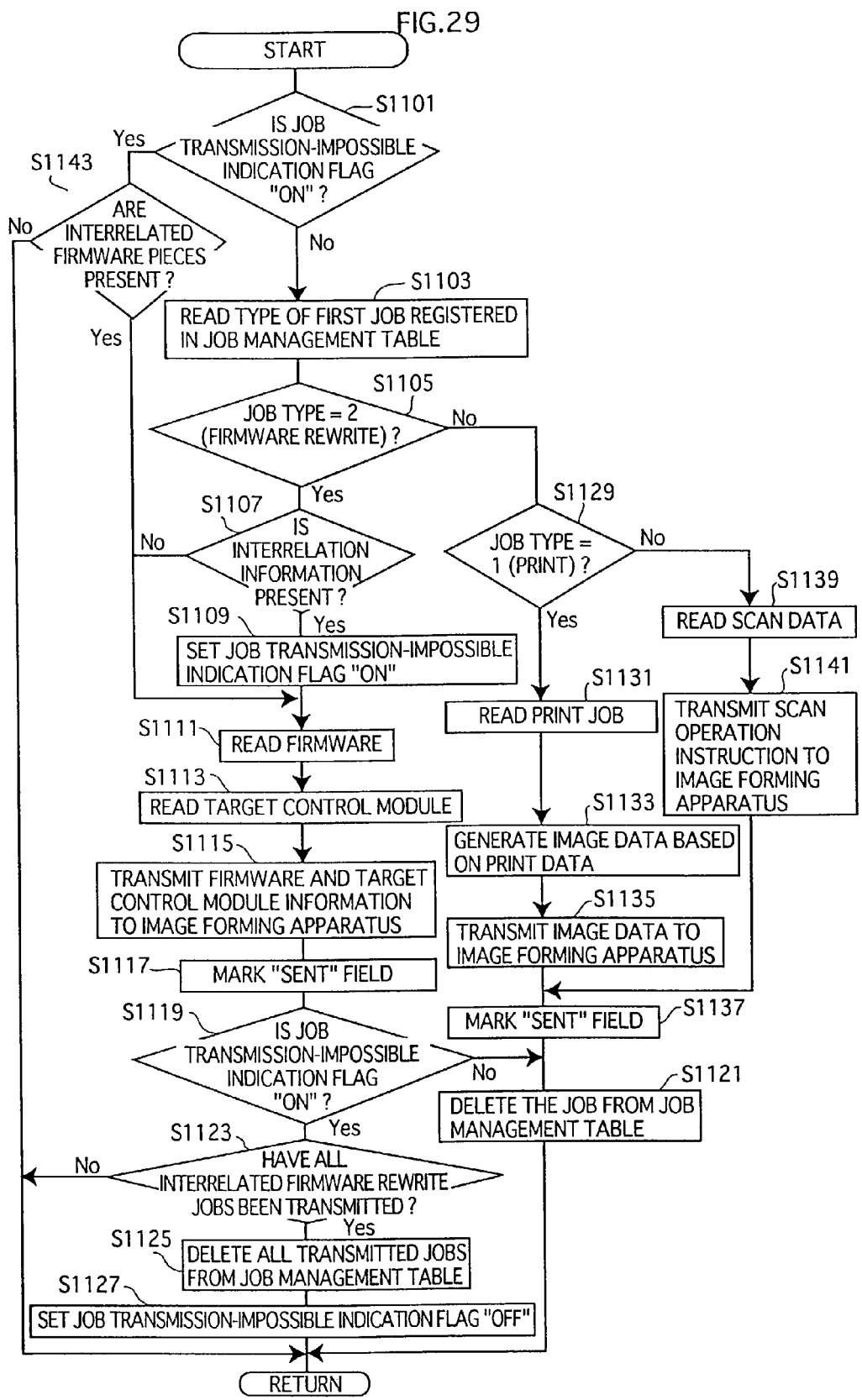

IMAGE PROCESSING APPARATUS, MANAGEMENT UNIT FOR IMAGE FORMING APPARATUS, AND PROGRAM EXECUTED BY IMAGE PROCESSING APPARATUS OR BY MANAGEMENT UNIT FOR IMAGE FORMING APPARATUS

This application is based on Patent Application No. 2001-235503 filed in Japan, the content of which is hereby incorporated by reference.

BACKGROUND OF THE INVENTION (1) Field of the Invention

The present invention relates to an image processing apparatus such as a printer, a facsimile, a scanner, and a copier, a management unit for an image forming apparatus, and a program to be executed by the image processing apparatus or by the management unit for the image forming apparatus. In particular, the present invention relates to a technique for rewriting firmware that is incorporated in an apparatus.

(2) Related Art

Conventionally, firmware that controls the operations of an image processing apparatus is stored in a mask ROM on a substrate provided within the apparatus. When it becomes necessary to rewrite the firmware, a worker has to exchange the mask ROM on the control substrate with another mask ROM storing new firmware.

Such a task to exchange mask ROMs not only takes time but also requires a complicated operation. Therefore, a flash ROM that is a rewritable memory has taken the place of a mask ROM in recent years. To be more specific, the following method is employed. An image processing apparatus is provided with an interface (I/F) with an external storage apparatus such as a memory card. A memory card storing new firmware for a rewrite purpose is connected to the I/F, and the new firmware is written over to the flash ROM within the image processing apparatus.

Also, as a method for rewriting firmware without dispatching a worker, new firmware may be distributed as being attached to an e-mail message, via the Internet, which has been increasingly widespread in recent years, and the firmware stored in the flash ROM can then be rewritten to the new firmware distributed.

For example, a network printer can receive new firmware for a rewrite purpose that is distributed via the Internet connected to a LAN, while receiving various jobs (e.g., print jobs) from terminals connected to the LAN. The network printer then can internally perform a firmware rewrite operation (a firmware rewrite job) using the received new firmware.

In this case, jobs such as a print job and a firmware rewrite job are typically executed one at a time in the order of reception. Naturally, while firmware is being rewritten (i.e., while a firmware rewrite job is being executed), other jobs that are related to the firmware cannot be executed.

Along with the recent trend of more sophisticated functions and more multiple functions of image processing apparatuses including network printers, a capacity of firmware to be incorporated into each image processing apparatus is expanding year after year. Firmware with a capacity of as large as about 10M bytes is now available. Accordingly, time taken for rewriting such firmware can be as long as about several tens minutes.

Therefore, if jobs are executed in the order of reception as conventionally, execution of a print job or the like that has been received at the start of executing a firmware rewrite job may be delayed for a long time.

SUMMARY OF THE INVENTION

The first objective of the present invention is to provide an image processing apparatus that can execute firmware rewrite jobs and other jobs such as print jobs in an appropriate order.

The second objective of the present invention is to provide a management unit for an image forming apparatus that can execute firmware rewrite jobs and other jobs such as print jobs in an appropriate order.

The third objective of the present invention is to provide a program that is executed by the image processing apparatus or by the management unit for the image forming apparatus.

The fourth objective of the present invention is to provide an image processing apparatus in which execution of an image processing job is less likely to be delayed due to execution of a firmware rewrite job.

The first objective of the present invention can be fulfilled by an image processing apparatus, including: a memory storing a piece of firmware; a job reception unit for receiving an image processing job; an image processing job execution controller for executing the image processing job using the piece of firmware; a firmware reception unit for receiving a piece of firmware for a rewrite purpose distributed from an external device; a firmware rewrite controller for executing a firmware rewrite job of rewriting the piece of firmware stored in the memory to the received piece of firmware; a judgment unit for judging a type of the received piece of firmware; and a job management controller for, when the image processing job and the firmware rewrite job are both placed in a wait state for execution, (a) adjusting an execution order of the image processing job and the firmware rewrite job according to the type of the received piece of firmware, and (b) instructing the image processing job execution controller and the firmware rewrite controller to respectively execute the image processing job and the firmware rewrite job in the adjusted execution order.

The second objective of the present invention can be fulfilled by a management unit for an image forming apparatus that includes an image processing job execution controller, the image processing job execution controller executing an image processing job using a piece of firmware stored in a memory, the management unit including: a job reception unit for receiving an image processing job; a firmware reception unit for receiving a piece of firmware for a rewrite purpose distributed from an external device; a firmware rewrite instruction controller for instructing to execute a firmware rewrite job of rewriting the piece of firmware stored in the memory to the received piece of firmware; a judgment unit for judging a type of the received piece of firmware; a job management controller for, when the image processing job and the firmware rewrite job are both placed in a wait state for execution, (a) adjusting an execution order of the image processing job and the firmware rewrite job according to the type of the received piece of firmware, and (b) instructing the image forming apparatus to execute the image processing job and the firmware rewrite job in the adjusted execution order.

The third objective of the present invention can be fulfilled by a program to be executed in an image processing apparatus or a management unit for an image forming apparatus, the image processing apparatus and the management unit for the image forming apparatus each including a controller executing an image processing job using a piece of firmware stored in a memory, the program including: a first step of receiving an image processing job; a second step of receiving a piece of firmware for a rewrite purpose distributed from an external device; a third step of judging a type of the received piece of firmware; and a fourth step of adjusting an execution order of the image processing job and the firmware rewrite job according to the type of the received piece of firmware judged in the third step, when the image processing job and a firmware rewrite job of rewriting the piece of firmware stored in the memory to the received piece of firmware are both placed in a wait state for execution.

The fourth objective of the present invention can be fulfilled by An image processing apparatus, including: a memory storing a piece of firmware; a job reception unit for receiving an image processing job; an image processing job execution controller for executing the image processing job using the piece of firmware; a firmware reception unit for receiving a piece of firmware for a rewrite purpose distributed from an external device; a firmware rewrite controller for executing a firmware rewrite job of rewriting the piece of firmware stored in the memory to the received piece of firmware; and a job management controller for, when the image processing job and the firmware rewrite job are both placed in a wait state for execution, (a) adjusting an execution order of the image processing job and the firmware rewrite job in such a manner that the image processing job comes before the firmware rewrite job, and (b) instructing the image processing job execution controller and the firmware rewrite controller to respectively execute the image processing job and the firmware rewrite job in the adjusted execution order.

BRIEF DESCRIPTION OF THE DRAWINGS

These and other objects, advantages and features of the invention will become apparent from the following description thereof taken in conjunction with the accompanying drawings that illustrate a specific embodiment of the invention.

In the drawings:

FIG. 5 shows a register information table stored in a disk unit in the center apparatus;

FIG. 8A shows a certain registration state of a job management table stored in an NV-RAM in the printer controller relating to the first embodiment;

FIG. 8B shows a certain registration state of the job management table stored in the NV-RAM in the printer controller relating to the first embodiment;

FIG. 8C shows a certain registration state of the job management table stored in the NV-RAM in the printer controller relating to the first embodiment;

FIG. 20A shows a certain registration state of a job management table stored in an NV-RAM in a printer controller relating to the second embodiment;

FIG. 20B shows a certain registration state of the job management table stored in the NV-RAM in the printer controller relating to the second embodiment;

FIG. 28A shows a certain registration state of a job management table stored in an NV-RAM in a printer controller relating to the third embodiment;

FIG. 28B shows a certain registration state of the job management table stored in the NV-RAM in the printer controller relating to the third embodiment;

FIG. 28C shows a certain registration state of the job management table stored in the NV-RAM in the printer controller relating to the third embodiment;

FIG. 29 is a flowchart showing a job transmission process executed by the printer controller relating to the third embodiment for transmitting a job to the image forming apparatus.

DESCRIPTION OF THE PREFERRED EMBODIMENTS

The following describes preferred embodiments of the present invention, with reference to the drawings.

First Embodiment

<System Construction>

Figure 1:
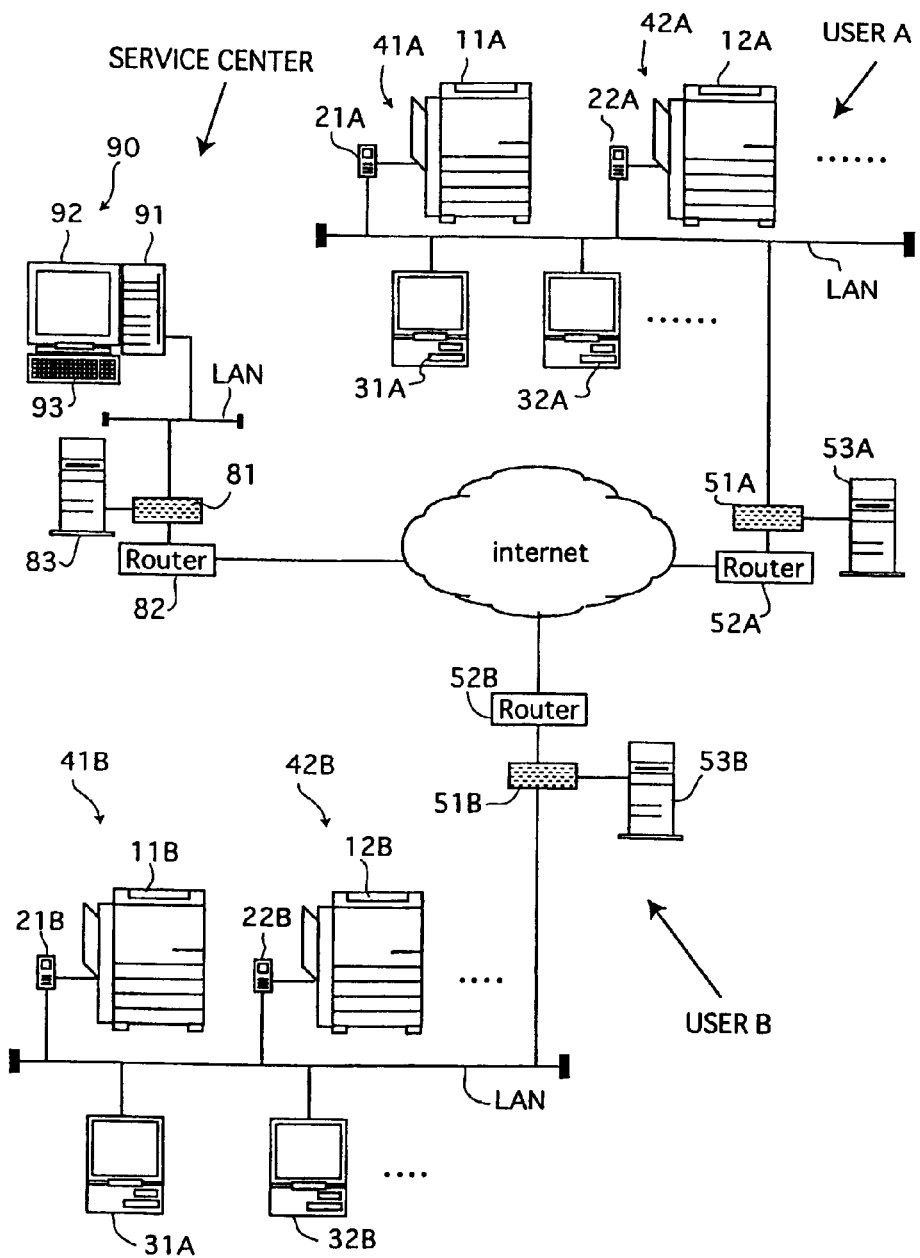
FIG. 1 shows a schematic construction of a firmware rewrite system.

FIG. 1 shows a schematic construction of a firmware rewrite system relating to a first embodiment of the present invention.

The system has a construction in which a local area network (LAN) at a service center and LANs at users A, B, . . . are connected to the Internet via routers 82, 52A, 52B, . . . A piece of firmware distributed from the service center via the Internet, is used to rewrite a piece of firmware stored within image forming apparatuses 11A, 12A, . . . , and 11B, 12B, . . . located at the users A, B, . . . Here, "firmware" is software incorporated for the purpose of controlling a hardware device, and specifically, firmware is programs or data that cannot be changed freely by users. Examples of firmware include basic software such as an operating system (OS), an interpreter, a compiler, a basic input output system (BIOS), a boot program, an input-output program, a control program for an image processing circuit of an image forming apparatus, a control program for a drive load of an image forming apparatus, and data such as parameters and variables. It should be noted here that three or more users are actually connected to the service center. Because of space limitations, however, only two users A and B are shown in the figure. It should also be noted here that the apparatus construction is the same for both the users A and B, and so apparatuses at the user B are given the same reference numerals as the apparatuses at the user A and are not described here.

At the service center, a center apparatus 90 that is roughly composed of a display 92, a keyboard 93, and a computer 91 is located. The computer 91 is connected to a LAN at the service center, and further to the Internet via a firewall 81 and a router 82. Also, a mail server 83 is connected to the LAN for managing transmission and reception of e-mail messages. In the center apparatus 90, a piece of firmware for a rewrite purpose that is to be installed in an image forming apparatus located at each user is generated by an operator's operation. Such a firmware piece for a rewrite purpose generated in the center apparatus 90 is distributed to each user as being attached to an e-mail message.

At the user A, a mail server 53A is located for managing transmission and reception of e-mail messages. The mail server 53A is connected to a LAN at the user, and further to the Internet via a firewall 51A and a router 52A. The mail server 53A receives an e-mail message forwarded to the user A from the center apparatus 90 that is an external device, via the Internet, and spools the received e-mail message. The spooled e-mail message is fetched at a regular time interval by a printer controller that is described later.

Also, at the user A, a plurality of image processing apparatuses 41A, 42A, . . . that are respectively composed of image forming apparatuses 11A, 12A, . . . , and their management units, i.e., printer controllers 21A, 22A, . . . are located.

The image forming apparatuses 11A, . . . each have the functions of (a) reading an image of a document that is set on a document tray by scanning the image using a scanner and printing the image on a sheet using electrophotography to reproduce the image, (b) printing an image on a sheet based on image data received from a client apparatus that is described later or image data received via the mail server 53A, (hereafter referred to as a "print job"), and (c) reading an image of a document that is set on a document tray according to an instruction given by a client apparatus that is described later and transmitting the read image data to the client apparatus (hereafter referred to as a "scan job"). Each image forming apparatus is therefore typically referred to as a multiple function peripheral (MFP). Each image forming apparatus is given an e-mail address unique to the apparatus. For example, an e-mail address of the image forming apparatus 11A is "device1@customerA.com" and an e-mail address of the image forming apparatus 12A is "device2@customerA.com". Also, a model of each image forming apparatus is identified by a model name. For example, a model name of the image forming apparatus 11A is "model 1", and a model name of the image forming apparatus 11B is "model 3". Apparatuses of the same model have the same construction.

The printer controllers 21A, . . . each have, as one of its functions, the function of managing various jobs that are executed by the image forming apparatuses 11A, . . . . To be more specific, each printer controller has the function of receiving a print job from a client apparatus that is described later, transmitting the print job to an image forming apparatus, reading an e-mail message from the mail server 53A, analyzing the e-mail message, and transmitting a firmware piece distributed as being attached to the e-mail message, if any, to an image forming apparatus.

Also, at the user A, a plurality of client apparatuses 31A, 32A, . . . , that are personal computers are located. Each client apparatus is connected to the LAN at the user. Each client apparatus has the function of generating image data by an operator's operation, and transmitting the image data to a printer controller to make the printer controller execute a print process, or giving a scan request (an instruction to execute a scan job) to an image processing apparatus on which a document is set.

The following describes a detailed construction of each apparatus included in the above system.

<Image Forming Apparatus>

Figure 2:
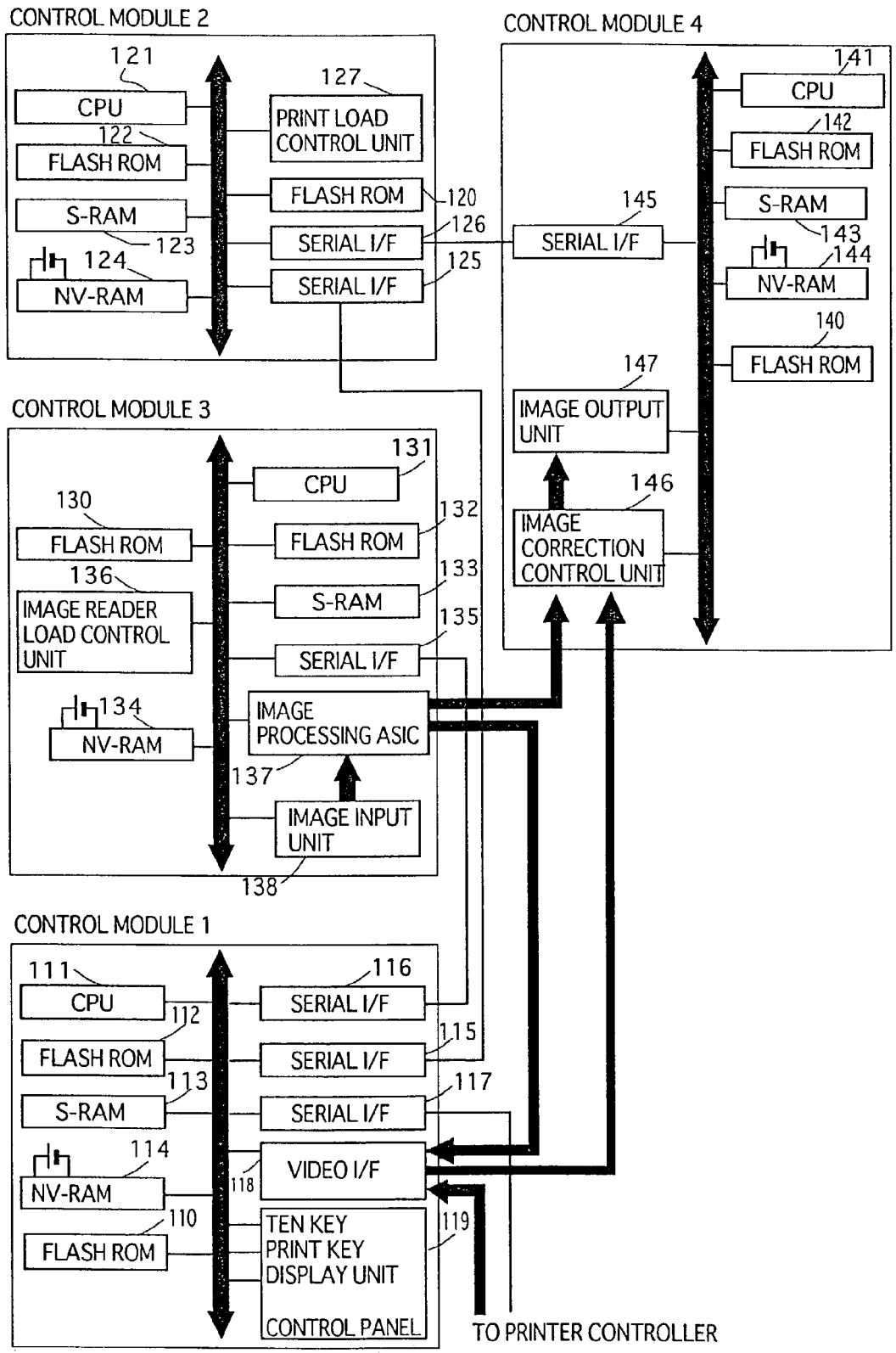
FIG. 2 is a block diagram showing an overall construction of a control part of an image forming apparatus relating to a first embodiment of the present invention.

FIG. 2 is a block diagram showing an overall construction of a control part of the image forming apparatus 11A. An overall construction of a control part of each of the other image forming apparatuses is the same as the overall construction of the control part of the image forming apparatus 11A, and so the following only describes as a typical example the control part of the image forming apparatus 11A.

The image forming apparatus 11A includes a plurality of control modules (four modules in this example) each being provided for handling a different control target or a different control content. That is to say, the control part of the image forming apparatus 11A is constructed by a plurality of control units (control modules). Each of the control modules 1 to 4 includes a central processing unit (CPU). It should be noted here that a "module" referred to in this specification intends to mean a software part or a hardware part that can be handled independently, more specifically, a CPU or a control circuit including a CPU, i.e., a functional block that executes a control function. The control modules 1 to 4 are respectively given, as their identifiers, module numbers 1 to 4.

The control modules 1 to 4 respectively include, in addition to the CPUs 111, 121, 131, and 141, flash ROMs 112, 122, 132, and 142, and flash ROMs 110, 120, 130, and 140. The flash ROMs 112, 122, 132, and 142 are firmware storage units for storing firmware pieces that are programs to be executed by the CPUs 111, 121, 131, and 141 (hereafter referred to as "program firmware pieces"). The flash ROMs 110, 120, 130, and 140 are firmware storage units for storing firmware pieces that are control parameters used when the programs are executed (hereafter referred to as "parameter firmware pieces"). It is needless to say here that each flash ROM is a rewritable nonvolatile memory. Also, control parameters are specifically numerical data used when the programs are executed. Examples of control parameters include correction data that is referred to when read image data is subjected to γ correction, and a feed speed of a print sheet (i.e., a rotation speed of a motor that drives a print sheet feeding mechanism).

The control module 1 comprehensively controls the control modules 2 to 4 by transmitting control instructions and control information (control data) to the control modules 2 to 4. The control module 1 includes, in addition to the CPU 111 and the flash ROMs 110 and 112, an S-RAM 113 that is a work area used for executing a program, an NV-RAM (nonvolatile RAM) 114 for storing various set values, a serial I/F 115 for transmitting and receiving various control data to and from the control module 2, a serial I/F 116 for transmitting and receiving various control data to and from the control module 3, a video I/F 118 for passing image data to and from the printer controller 21A, the control module 2, and the control module 4, and a control panel 119. It should be noted here that the control module 1 (CPU 111) outputs a signal indicating whether any of the control modules 1 to 4 including itself is presently executing a job or not, to the printer controller 21A. To be more specific, the control module 1 outputs, to the printer controller 21A, a signal "BUSY" when any job is presently being executed, and a signal "READY" when no job is presently being executed and reception of a new job is possible.

The control module 2 controls drive loads such as a motor, a heater (toner fixing apparatus), and an electromagnetic switch that are used to execute a print process in the image forming apparatus 11A. The control module 2 includes, in addition to the CPU 121 and the flash ROMs 120 and 122, an S-RAM 123 that is a work area used for executing a program, an NV-RAM (nonvolatile RAM) 124 for storing various set values, a serial I/F 125 for transmitting and receiving various control data to and from the control module 1, a serial I/F 126 for transmitting and receiving various control data to and from the control module 4, and a print load control unit 127 that is constructed by a drive control circuit for each above drive load.

The control module 3 performs image processing control for realizing various image processing on image data obtained as a result of scan control for reading a document set on a document tray or reading of the document. The control module 3 includes, in addition to the CPU 131 and the flash ROMs 130 and 132, an S-RAM 133 that is a work area used for executing a program, an NV-RAM (nonvolatile RAM) 134 for storing various set values, a serial I/F 135 for transmitting and receiving various control data to and from the control module 1, an image input unit 138 for performing photoelectric conversion using a CCD on reflected light from a document that is illuminated with a scanning lamp, subjecting the obtained analogue data to A/D conversion to obtain digital data, and outputting, as image data, the digital data to an image processing ASIC 137, the image processing ASIC for subjecting the image data input from the image input unit 138 to various processing including shading correction, reflectance and density conversion, MTF correction, density correction, and binarization processing such as error diffusion, and then outputting the resulting image data to the control module 4 or the control module 1, and an image reader load control unit 136 that is composed of drive control circuits for various drive loads such as a scan motor and a scan lamp.

The control module 4 performs an image correction process including γ correction on image data, and drives an LD (laser diode) by a signal being modulated, based on the image data on which the correction process has been performed, so as to expose a photoconductive drum. The control module 4 includes, in addition to the CPU 141 and the flash ROMs 140 and 142, an S-RAM 143 that is a work area used for executing a program, an NV-RAM (nonvolatile RAM) 144 for storing various set values, a serial I/F 145 for transmitting and receiving various control data to and from the control module 1, an image correction control unit 146 for subjecting image data input from the control module 3 or the control module 1 to various processing including smoothing, halftone reproduction, and image correction, and an image output unit 147 for driving an LD by a signal being modulated, based on the corrected image data.

With the above construction, transmission and reception of control data among the control modules 1 to 4 is performed via each serial I/F as described above. Also, to rewrite a firmware piece in each control module, a firmware piece for a rewrite purpose is transmitted (transferred) via each serial I/F from the control module 1 that firstly receives the firmware piece for a rewrite purpose as described later. Such a construction realizing communication via a serial I/F is suitable for transmitting control data whose data size is relatively small. Therefore, transmitting data whose data size is large like a firmware piece via a serial I/F requires long time.

On the other hand, image data is transferred among the video I/F 118, the image processing ASIC 137, and the image correction control unit 146, between the image input unit 138 and the image processing ASIC 137, and between the image correction control unit 146 and the image output unit 147, and therefore, data buses that can transmit data at relatively high speed are used to realize respective connections therebetween.

It should be noted here that the CPU and the two flash ROMs in each control module are positioned physically as close to one another as possible. Also, the CPU and the two flash ROMs are connected using the shortest path possible.

By doing so, while the CPU is loading a program, an influence of noise from outside of the control module can be decreased, and also, loading of a program can be performed promptly at the time when power is turned on in the image forming apparatus.

As described above, each control module in the image forming apparatus 11A is provided for handling a different control target or a different control content. To be more specific, the control module 3 operates when a scan job is executed, and the control module 2 and the control module 4 operate when a print job is executed. Also, the control module 1 that comprehensively controls the control modules 2 to 4 operates when any kind of job is executed.

<Center Apparatus>

Figure 3:
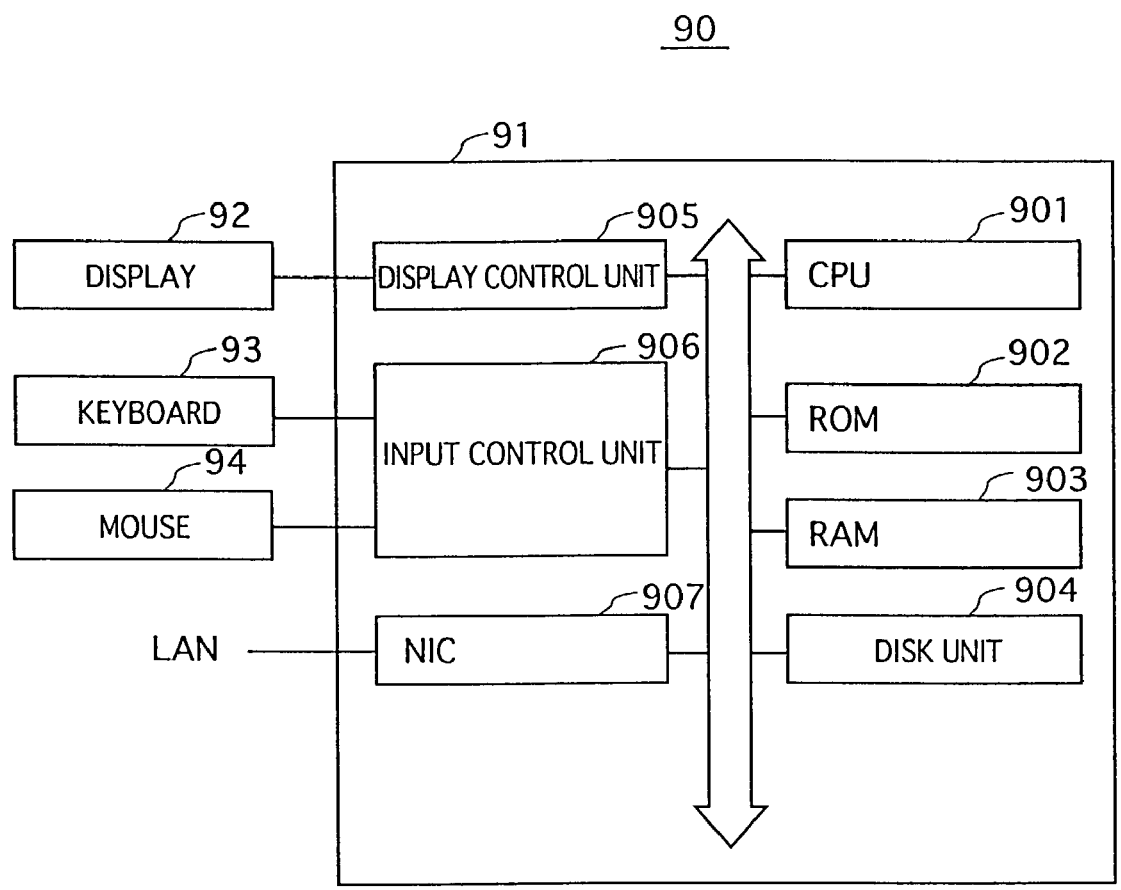
FIG. 3 is a block diagram showing a construction of a center apparatus.

FIG. 3 is a block diagram showing a construction of the center apparatus 90.

As shown in the figure, the computer 91 includes a CPU 901, a ROM 902, a RAM 903, a disk unit 904, a display control unit 905 that controls display of the display 92, an input control unit 906 that controls reception of an input from an input device such as the keyboard 93 and a mouse 94, and a network interface card (NIC) 907 for transmitting and receiving data to and from other apparatuses via a LAN.

At the service center, an operator uses the center apparatus to generate program firmware pieces and parameter firmware pieces for control modules included in image forming apparatuses of various models. Firmware pieces generated there are categorized into program firmware pieces and parameter firmware pieces, and are stored in different folders (directories) in the disk unit 904 as being separated for each image forming apparatus model and for each control module included therein.

In accordance with an instruction of an operator, a generated firmware piece is distributed to a user (image forming apparatus) as being attached to an e-mail message.

Figure 4:
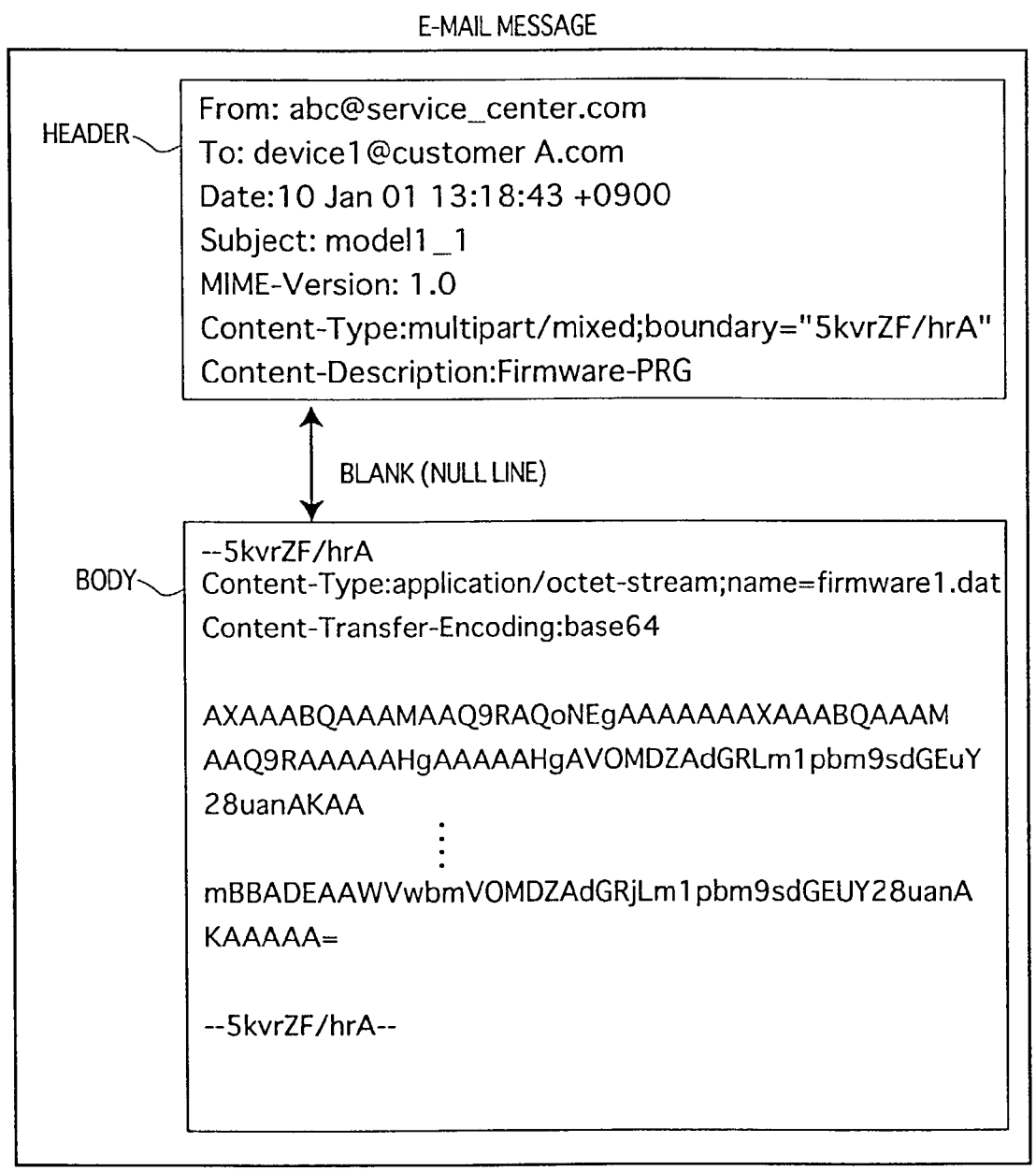
FIG. 4 shows one example of an e-mail message to which a firmware piece is attached that is generated by the center apparatus and distributed to the image forming apparatus in the first embodiment.

FIG. 4 shows one example of an e-mail message to which a firmware piece is attached.

This e-mail message is compliant with the Internet standard relating to messages (RFC822), and is roughly composed of a header for containing a description of a recipient address and the like and a body for containing a description of a firmware piece. The header and the body are divided by a null (blank) line.

The header is composed of a plurality of header fields specified by the Internet standard (RFC822). Each header field includes two parts divided by a colon ":", namely, a field name at the left and a field body at the right.

Also, the header not only includes fields specified by RFC822 such as "From", "To", "Date", and "Subject", but also includes such fields as "MIME-Version", "Content-Type", and "Content-Description" along with the MIME (multipurpose internet mail extensions) standard.

In the header, below the field "From" (showing a sender) on the first line, the field "To" (showing a recipient) is provided on the second line. A field body of the field "To" contains a description of an e-mail address of an image forming apparatus.

On the fourth line, the field "Subject" is provided. A field body of the field "Subject" is used to identify a model of the image forming apparatus that is to be a firmware rewrite target and to identify a target control module included in the image forming apparatus. This field body contains a character string in which a model name of the image forming apparatus and a module number of the control module designated by the operator are connected by an under bar "_". In the present example, a rewrite target is a control module (specifically, a flash ROM in a control module) with a module number "1" included in an image forming apparatus of a model name "Model 1".

A field body of the field "Content-Type" contains a description of "multipart/mixed" for enabling the body of the message to be divided into a plurality of parts, and contains a US-ASCII character string ("5kvrZF/hrA" in the present example) suitable for a parameter "boundary" indicating a boundary of each of the plurality of parts.

A field body of the field "Content-Description" contains a description of "Firmware-PRG" when a firmware piece stored in the body is a program firmware piece, and a description of "Firmware-DAT" when the firmware piece is a parameter firmware piece. According to the MIME standard, a field body of the field "Content-Description" can contain freely-chosen US-ASCII characters. Therefore, the field body of the field "Content-Description" contains "Firmware-PRG" or "Firmware-DAT" to indicate that a firmware piece is attached to the e-mail message and also to indicate a type of the attached firmware piece.

As described above, the body of the e-mail message contains a description of a firmware piece. A firmware piece for use in an image forming apparatus is binary data. Here, RFC822 prohibits binary data from being contained directly in an e-mail message. Therefore, the firmware piece for use in the image forming apparatus is attached as a file to the body of the message in accordance with the MIME standard specified by RFC2045, RFC2046, and RFC2047.

To mark the start of the body of the message, a character string obtained by adding a symbol "--" before a boundary parameter value in the field "Content-Type" in the header is contained in the body.

Below the character string, the field "Content-Type" is provided. In a field body of the field "Content-Type", "application/octet-stream" indicating that the attached file is binary data is designated.

Below the field "Content-Type", the field "Content-Transfer-Encoding" is provided. In a field body of the field "Content-Transfer-Encoding", "base64" is designated. As described above, RFC822 prohibits binary data from being directly contained in an e-mail message, and therefore, the binary data needs to be converted into US-ASCII characters. The MIME standard specifies a plurality of such conversion formats. One of such formats is the "Base64" format designated in this field.

Below these two fields, a description of US-ASCII characters into which binary data of the firmware piece is converted in accordance with the Base64 format is contained.

Finally, to mark the end of the body, a character string ("--5kvrZF/hrA--" in the present example) obtained by adding a symbol "--" both before and after the boundary parameter value in the field "Content-Type" in the header is contained in the body.

Also, a resistor information table as shown in FIG. 5 is stored in the disk unit 904. In the resistor information table, an e-mail address and a model name of each image forming apparatus are registered in association with each another by the operator.

<Client Apparatus>

Figure 6:
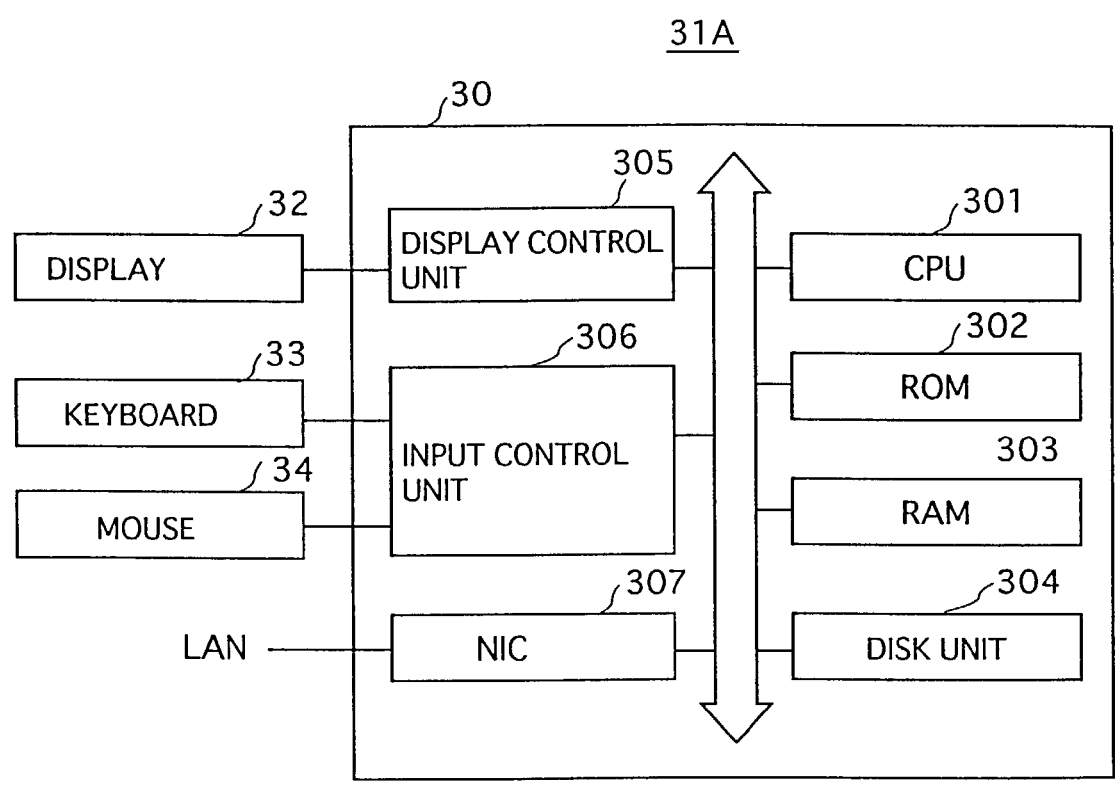
FIG. 6 is a block diagram showing a construction of a client apparatus.

FIG. 6 is a block diagram showing a construction of the client apparatus 31A. It should be noted here that a construction of the client apparatus 32A . . . , is basically the same as the construction of the client apparatus 31A, and so the following only describes as a typical example the construction of the client apparatus 31A.

As shown in the figure, a main body 30 includes a CPU 301, a ROM 302, a RAM 303, a disk unit 304, a display control unit 305 for controlling display of the display 32, an input control unit 306 for controlling reception of an input from an input device such as a keyboard 33 and a mouse 34, and an NIC 307 for transmitting and receiving various data to and from other apparatuses via a LAN.

In the ROM 302 of the client apparatus, a document edit application program, an image edit application program, a printer driver, and the like, have been installed. The CPU 301 executes these programs.

The client apparatus generates a print job in accordance with an instruction of the operator, and transmits the print job to a printer controller of an image forming apparatus designated by the operator. Also, the client apparatus transmits, in accordance with an instruction from the operator, a scan job request to a printer controller of an image forming apparatus designated by the operator. Before giving an instruction to transmit the scan job request, the operator is required to set a document on a document tray of the image forming apparatus to which the scan job request is to be transmitted.

<Printer Controller>

Figure 7:
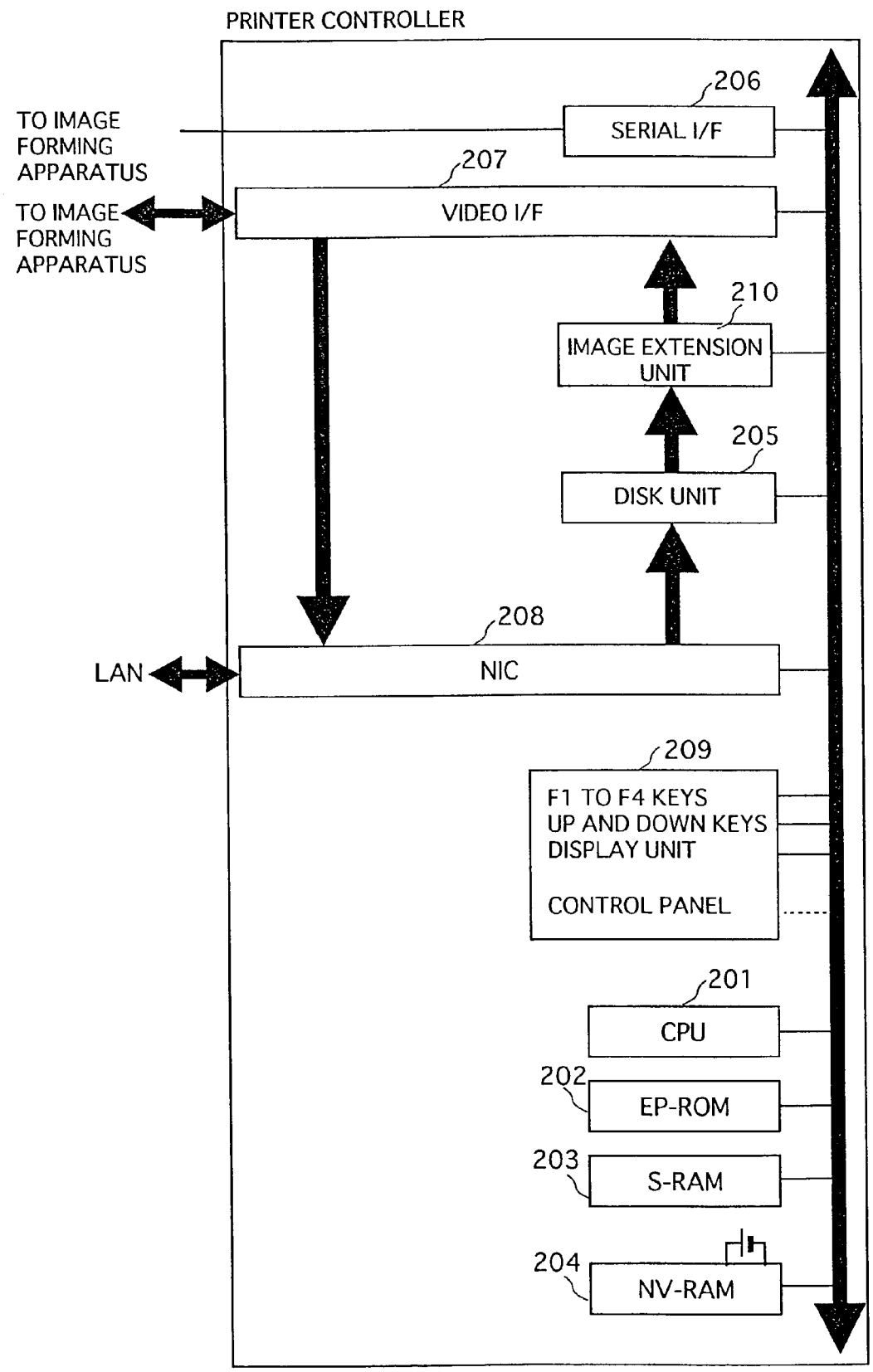
FIG. 7 is a block diagram showing a construction of a printer controller.

FIG. 7 is a block diagram showing a construction of the printer controller 21A.

As shown in the figure, the printer controller 21A includes a CPU 201, an EP-ROM (nonvolatile memory) 202 that stores a program to be executed by the CPU 201, an S-RAM 203 that is a work area used for executing a program, an NV-RAM 204 for storing various set values, and a control panel 209 that includes function keys F1 to F4 and a display unit for displaying a menu screen etc. for realizing various settings using the function keys.

It should be noted here that the NV-RAM 204 stores an IP address of its own apparatus and an IP address of the mail server 53A that becomes necessary for reading an e-mail message forwarded to the apparatus from the mail server 53A.

Further, the NV-RAM 204 includes a job management table as shown in FIG. 8A that is used for managing the execution order of received various jobs in the image forming apparatus 11A. As shown in the figure, the job management table is composed of a "job number" field, a "job type" field, an "additional information" field, and an "address" field.

The "job number" field shows a job number indicating the order in which a job is to be executed in the image forming apparatus 11A. When the image forming apparatus 11A is in a state capable of executing a job, the image forming apparatus 11A executes a job with a job number 1.

The "job type" field shows a type of a job. In this field, a number "1" is registered for a print job, a number "2" for a firmware rewrite job, and a number "3" for a scan job.

The "additional information" field shows, when a type of a job is a firmware rewrite job, a control module number of a rewrite target and a type of a firmware piece either being a program firmware piece or a parameter firmware piece.

The "address" field shows, as to each job registered in the job management table, a start address (storage address) of the job in the disk unit 205. By referring to the "address" field, a required job can be read from the disk unit 205. When a type of a job is a scan job, scan data such as an IP address of a client apparatus that has given the scan request is stored in the disk unit 205. In the case of the scan job, image data read by a scanner in the image forming apparatus 11A and input into the printer controller 21A is transmitted to the corresponding client apparatus via a video I/F 207 and an NIC 208.

Referring back to FIG. 7, the printer controller 21A includes the NIC 208, the disk unit 205, an image extension unit 210, the video I/F 207, and a serial I/F 206. The NIC 208 transmits and receives various information to and from other apparatuses. For example, the NIC 208 receives a print job from the client apparatus 31A, receives an e-mail message read from the mail server 53A, and transmits document image data read by an image forming apparatus to the client apparatus. The disk unit 205 temporarily stores the received print job, e-mail message, and the like. The image extension unit 210 reads a print job from the disk unit 205, extends print data of the print job written in the page description language (PDL) to generate bitmap data, and outputs the bitmap data to the video I/F 207. The video I/F 207 transmits the print data (bitmap data) output from the image extension unit 210 to the video I/F 118 in the image forming apparatus 11A, and receives image data read in the image forming apparatus 11A and output from the video I/F 118, and outputs the received image data to the NIC 208. The serial I/F 206 transmits a firmware piece for a rewrite purpose read from the disk unit 205, to the serial I/F 117 in the image forming apparatus 11A. A firmware piece for a rewrite purpose stored in the disk unit 205 is described in detail later.

It should be noted here that image data is transferred between the NIC 208 and the disk unit 205, between the disk unit 205 and the image extension unit 210, between the image extension unit 210 and the video I/F 207, between the video I/F 207 and the video I/F 118, and between the video I/F 207 and the NIC 208. Therefore, data buses that can transmit data at relatively high speed are used to realize respective connections therebetween.

The following describes control (process) contents of each apparatus in the above system, with reference to flowcharts.

<Process Executed by the Center Apparatus>

Figure 9:
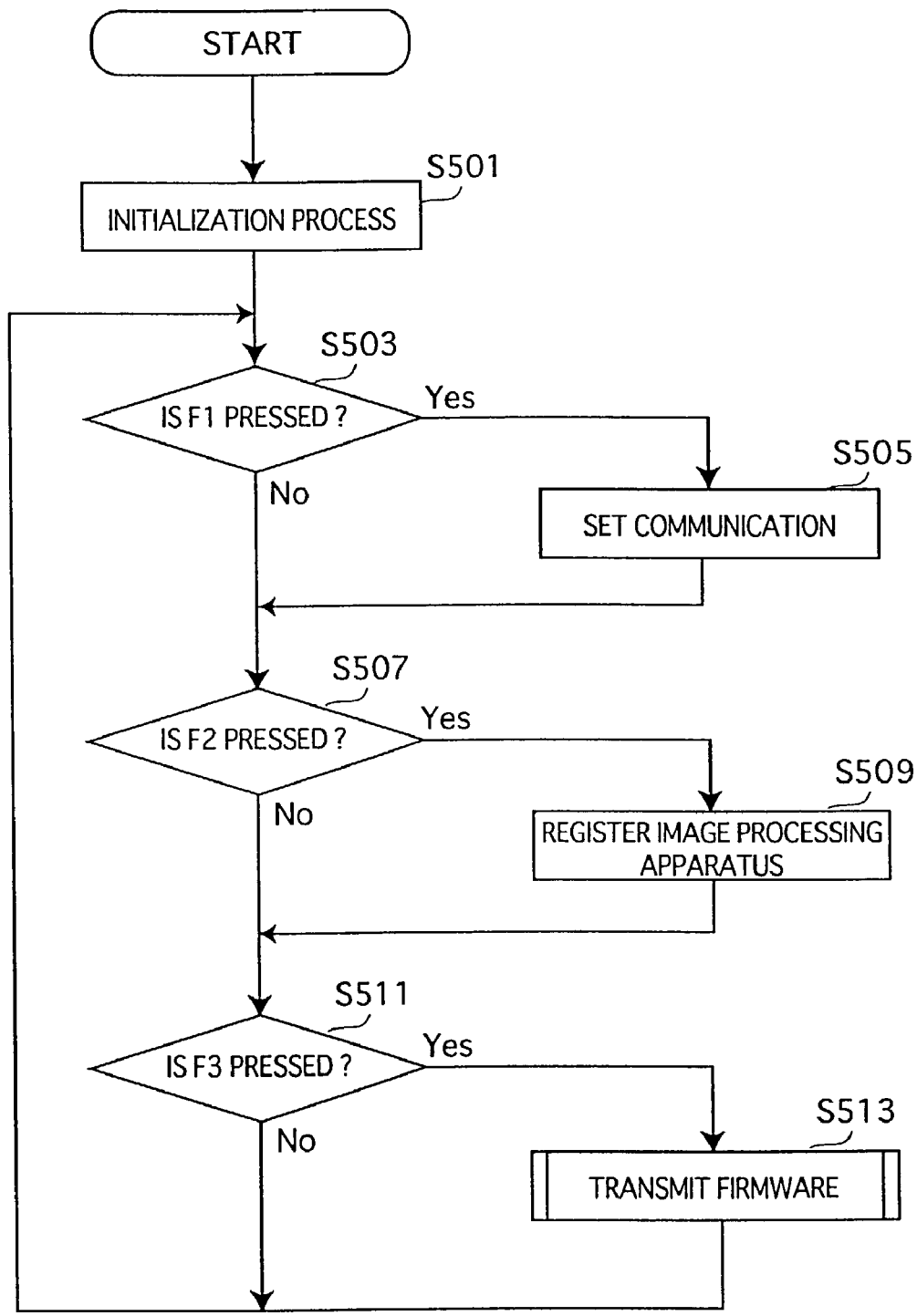
FIG. 9 is a flowchart showing a basic process executed by the center apparatus at the time of rewriting a firmware piece.

FIG. 9 is a flowchart showing a basic process executed by the CPU 901 of the center apparatus, at the time of rewriting a firmware piece.

A program shown by this flowchart is activated by a main power switch of the center apparatus 90 being turned on. First, an initialization process including an initialization of a memory and an initialization of parameters typically executed by a computer is executed (step S501).

Following this, when any one of the function keys F1 to F3 provided in the keyboard 93 is pressed ("Yes" in any of steps S503, S507, and S511), processing according to the pressed function key is executed.

To be more specific, when the function key F1 is pressed ("Yes" in step S503), a communication setting screen (not shown) for inputting information necessary for sending an e-mail message is displayed on the display 92. By following the communication setting screen, the operator inputs an IP address of the mail server 83, an e-mail address of the computer 91, or the like, via an input device such as the keyboard 93. The input information is stored in the disk unit 904 (step S505). When a firmware piece is distributed as being attached to an e-mail message, the e-mail address of the computer 91 stored in the disk unit 904 is written in the field body of the field "From" in the header of the e-mail message.

When the function key "F2" is pressed ("Yes" in step S507), an image forming apparatus registration screen (not shown) is displayed on the display 92. By following the registration screen, the operator inputs information such as a model of an image forming apparatus and an e-mail address of the image forming apparatus, or a name, an address, a telephone number, etc. of a user at which the image forming apparatus is located, via an input device. The input information is stored in the above-described resistor information table (see FIG. 5) (step S509). Here, the name, address, telephone number, etc. of the user are registered into an "other information" field in the register information table. Such other information is to help identify a location at which the image forming apparatus belongs (i.e., a user at which the image forming apparatus is located).

When the function key "F3" is pressed ("Yes" in step S511), a firmware transmission process is executed (step S513).

Figure 10:
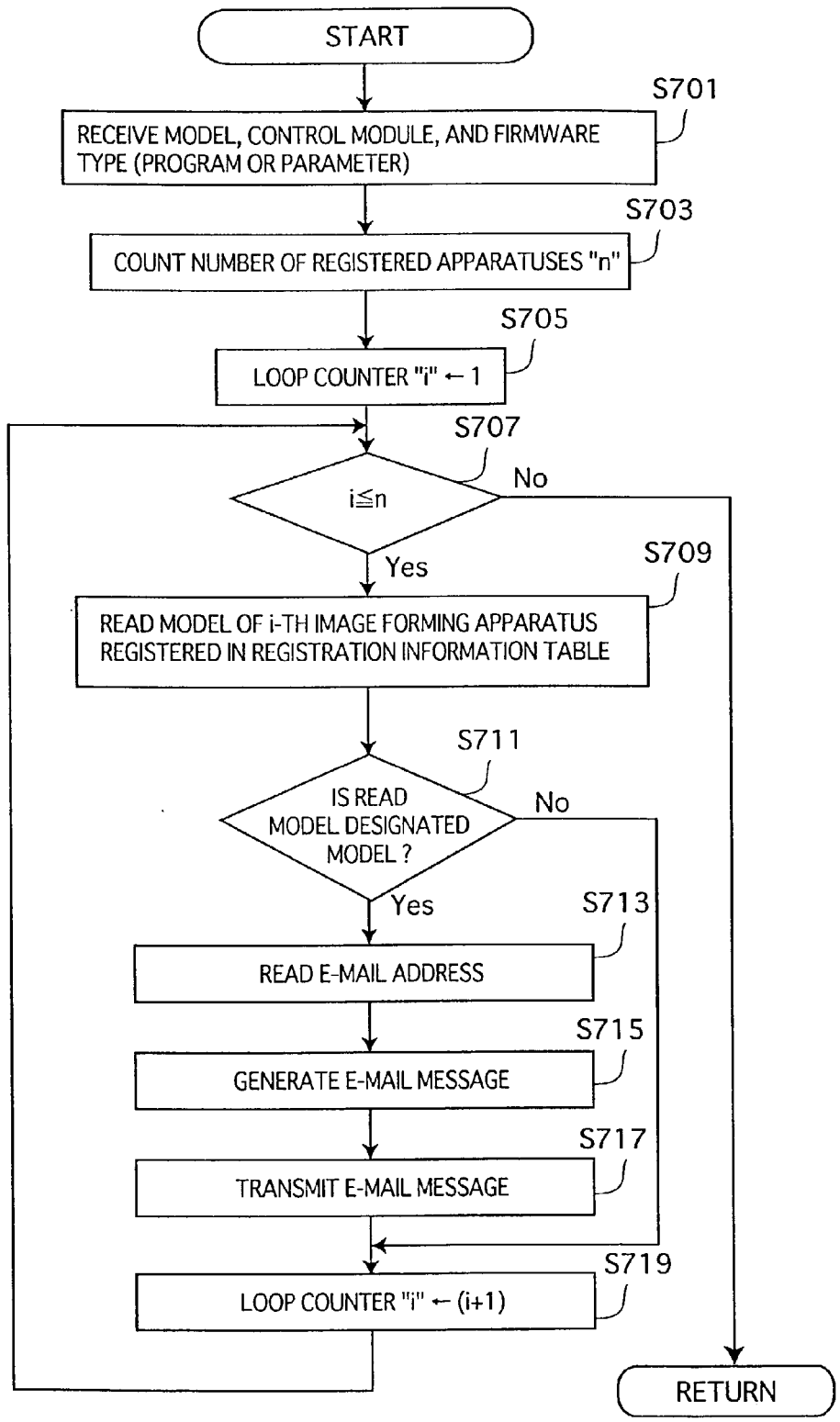
FIG. 10 is a flowchart showing a firmware transmission process executed by the center apparatus.

The following describes the firmware transmission process in detail, with reference to a flowchart shown in FIG. 10.

First, a rewrite designation screen (not shown) for designating a firmware rewrite target is displayed on the display 92. A model name of an image forming apparatus, a control module number, and a type of a firmware piece either being a program firmware piece or a parameter firmware piece input by the operator via an input device by following the rewrite designation screen are received (step S701). In this step, therefore, the operator is supposed to give an instruction to rewrite a firmware piece stored in a flash ROM in a control module in an image forming apparatus of a certain model.

When reception of the above information is completed, the number of image forming apparatuses registered in the register information table "n" is counted by referring to the register information table (step S703), and "1" is assigned to variable "i" that serves as a loop counter (step S705).

Following this, a value of the loop counter "i" is compared with a value of the number of apparatuses "n" (step S707). When the value of the loop counter "i" is no greater than the value of the number of apparatuses "n" ("Yes" in step S707), a model name of an image forming apparatus registered at the i-th line in the register information table is read (step S709) A judgment is performed as to whether the read model name matches a model name received (designated) in step S701 or not, i.e., whether the read model name matches a model name of a firmware rewrite target model or not (step S711).

When the read model name matches the designated model name ("Yes" in step S711), an e-mail address registered at the i-th line in the register information table is read (step S713). The read e-mail address is set as a recipient address, and an e-mail message to which a firmware piece is attached (see FIG. 4) is generated (step S715). It should be noted here that a firmware piece that is stored in association with the model name, the control module number, and the type of the firmware piece either being a program firmware piece or a parameter firmware piece, that are received in step S701 (designated by the operator) is read from the disk unit 904 and is attached to the e-mail address. Also, it is needless to say that information designated in step S701 and the like are written into field bodies of fields in the header of the e-mail message.

In step S717, the generated e-mail message is transmitted. To be more specific, TCP (transmission control protocol) connection is established with the mail server 83, based on the IP address of the mail server 83 that have been set and stored in the disk unit 904 in step S505, and then, the e-mail message is transmitted to the mail server 83 in accordance with SMTP (simple mail transfer protocol) (i.e., RFC821) that is the Internet standard for transmission of e-mail messages.

When the transmission of the e-mail message is completed, the loop counter "i" is incremented by one, and the processing returns to step S707.

The processing from step S707 is repeated until a value of the loop counter "i" exceeds a value of the number of registered apparatuses "n" ("No" in step S707), i.e., until the e-mail message to which the firmware piece is attached is transmitted completely to image forming apparatuses that are designated by the operator as firmware rewrite target apparatuses, out of all the registered image forming apparatuses. Then, when a value of the loop counter "i" exceeds a value of the number of registered apparatuses "n" ("No" in step S707), the routine shown in FIG. 7 ends.

With the above-described process, by the operator simply designating a model name and a control module of a rewrite target, and a type of a firmware piece either being a program firmware piece or a parameter firmware piece, a firmware piece for a rewrite purpose is distributed to all the corresponding image forming apparatuses.

<Process Executed by the Printer Controller>

Figure 11:
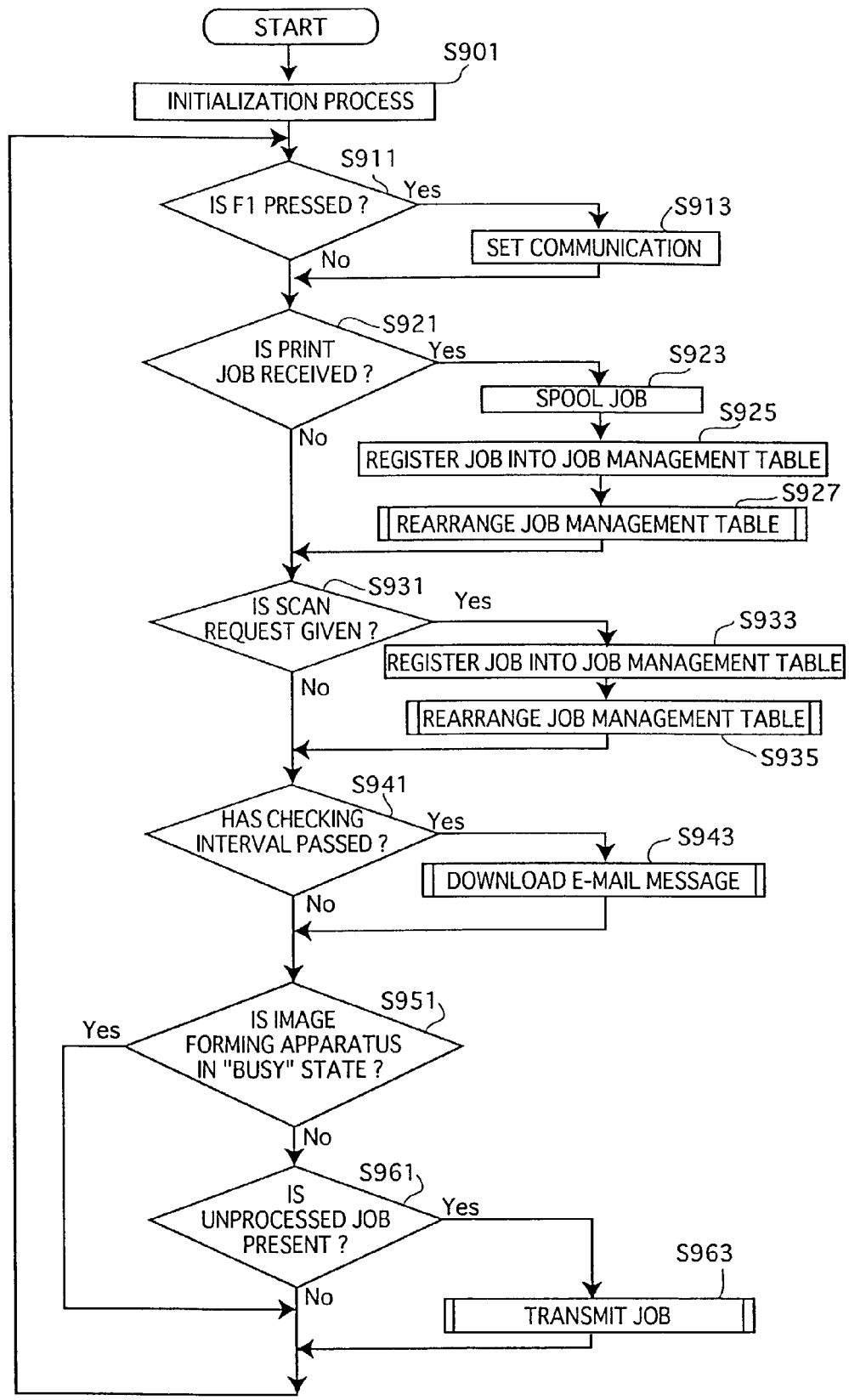
FIG. 11 is a flowchart showing a basic process executed by the printer controller relating to the first embodiment.

FIG. 11 is a flowchart showing a basic process executed by the CPU 201 (FIG. 7) of the printer controller 21A.

A program shown in the flowchart is activated by a main switch of the printer controller 21A being turned on. First, an initialization process including an initialization of a memory and an initialization of parameters typically executed by a computer is executed (step S901). Following this, processing described below is executed as necessary.

When the function key F1 is pressed ("Yes" in step S911), a communication setting screen (not shown) for inputting information necessary for transmitting and receiving an e-mail message is displayed on the display unit of the control unit 209. By following the communication setting screen, the operator inputs information such as an IP address of the mail server 53A, an e-mail address of the image forming apparatus 11A connected to the printer controller 21A, and a time interval at which it is checked whether a newly arrived e-mail message forwarded to the image forming apparatus 11A is present in the mail server 53A (hereafter referred to as a "checking interval") via the control panel 209. The input information is stored in the NV-RAM 204 (step S913). The checking interval, for example, may be set at around 1 to 20 min.

When a print job is received from any client apparatus ("Yes" in step S921), the received print job is spooled onto the disk unit 205 (step S923). Then, the print job is registered into the job management table (FIG. 8A) (step S925). At this point, the print job is registered at the last line in the job management table. When the registration is completed, the order of jobs registered in the job management table is rearranged if necessary.

Figure 12:
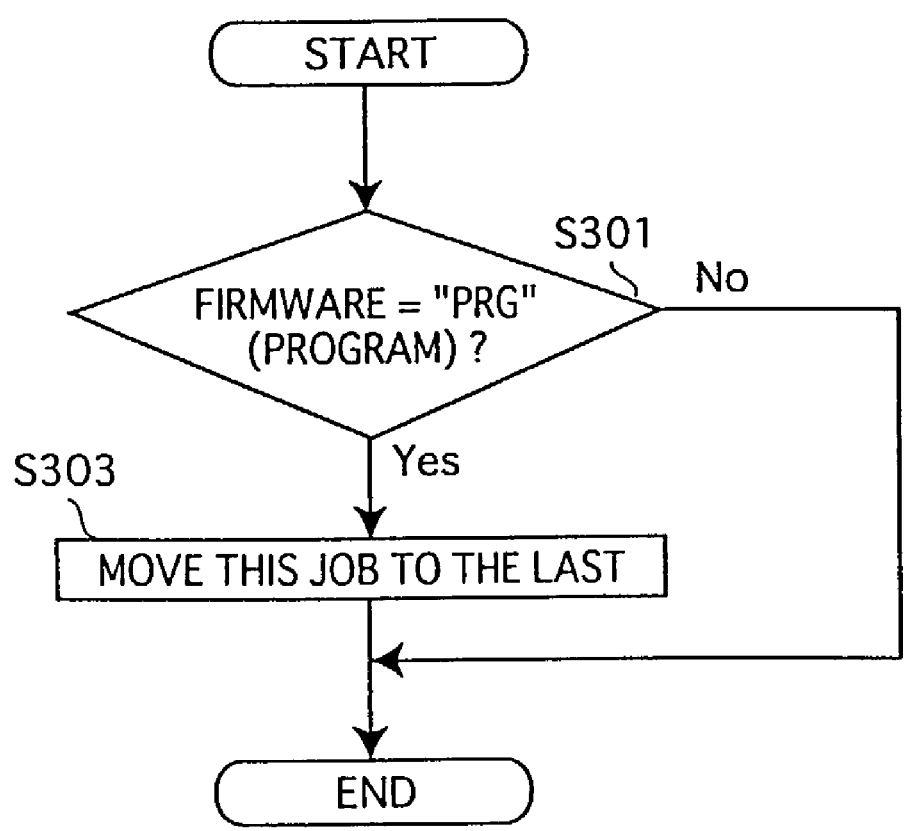
FIG. 12 is a flowchart showing a job management table rearrangement process executed by the printer controller relating to the first embodiment.

FIG. 12 is a flowchart showing a rearrangement process of the job management table. First, the "job type" field and the "additional information" field in the job management table are referred to. When at least one program firmware rewrite job is registered in the job management table ("Yes" in step S301), jobs registered in the job management table are rearranged in such a manner that the at least one program firmware rewrite job found therein is moved to the last line in the job management table (step S303). It should be noted here that when a plurality of program firmware rewrite jobs are found, the registration order of these program firmware rewrite jobs remains the same among themselves.

For example, in a case where a print job (with a job number "6" in FIG. 8B) is newly received and registered in the job management table that is in the registration state shown in FIG. 8A, such a process is performed as that a program firmware rewrite job registered therein is moved to the last line, and the print job is moved upward by one line to fill a blank line resulting from the moved program firmware rewrite job (FIG. 8C).

Referring back to FIG. 11, when a scan request is given from any client apparatus ("Yes" in step S931), the scan job is registered at the last line in the job management table (step S933). Then, a job management table rearrangement process is performed (step S935). The job management table rearrangement process in step S935 is the same as the process described in step S927, and so is not described here. In this way, when both an image processing job, such as a print job and a scan job, and a program firmware rewrite job that requires long processing time are placed in an execution queue, the execution order is adjusted in such a manner that the image processing job precedes the program firmware rewrite job, regardless of the order of reception. Accordingly, such a case where execution of a print job and a scan job (such jobs are hereafter referred to as "image processing jobs") is delayed long can be avoided. On the other hand, rewriting a parameter firmware piece generally requires only short processing time, and so a parameter firmware rewrite job is processed as normal in the order of reception.

Following this, in step S941, a judgment is performed as to whether the checking interval has passed since when it was previously checked whether a newly arrived e-mail message forwarded to the image forming apparatus 11A was present in the mail server 53A or not. When the judgment result shows that the checking interval has passed, the processing advances to step S943. In step S943, it is checked whether such an e-mail message is present or not. When such an e-mail message is present, the e-mail message is downloaded.

Figure 13:
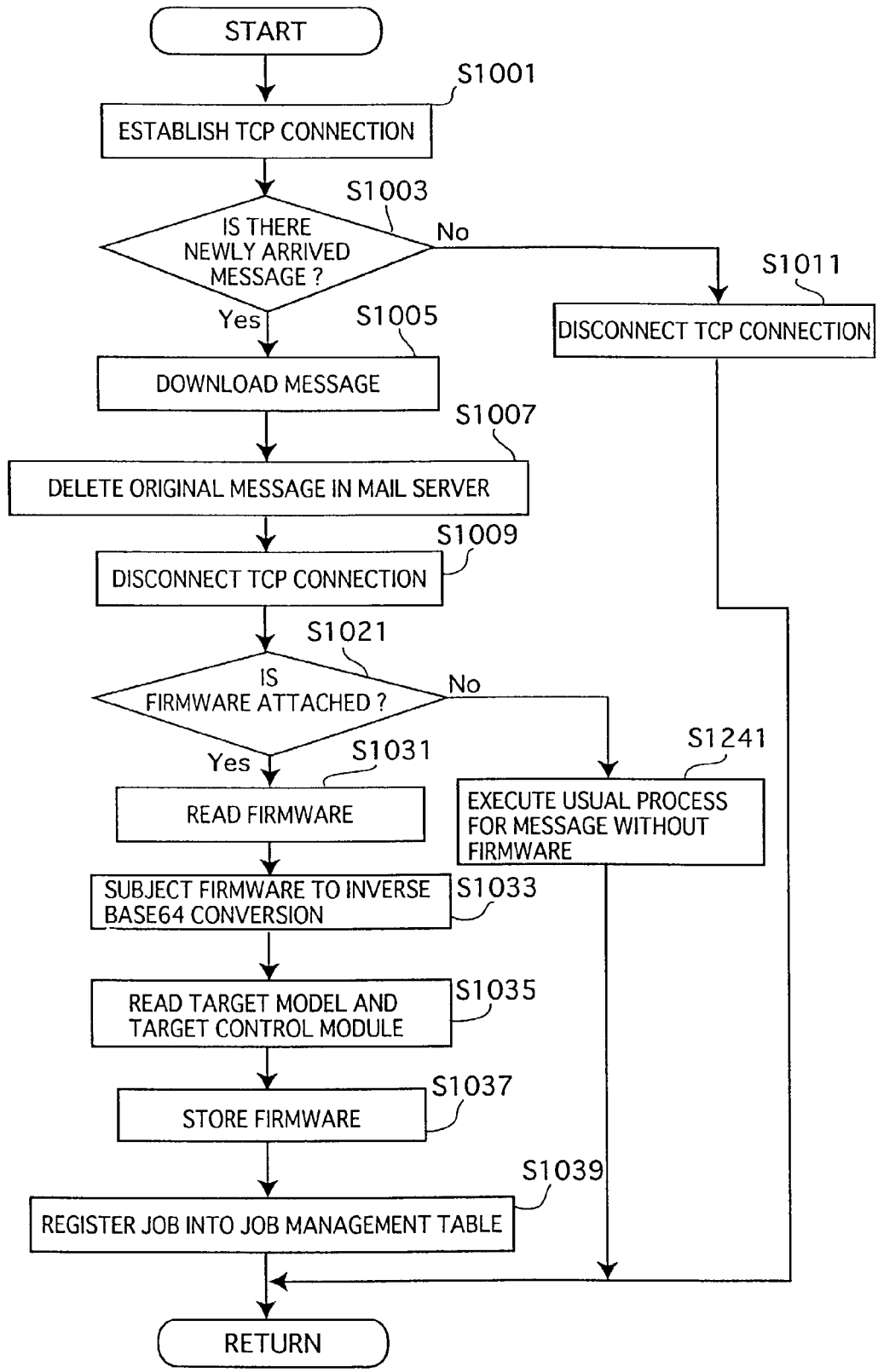
FIG. 13 is a flowchart showing an e-mail message download process executed by the printer controller.

FIG. 13 is a flowchart showing the processing in step S943 in detail.

First, TCP connection with the mail server 53A is established, based on the IP address of the mail server 53A (step S1001). It is checked whether a newly arrived e-mail message forwarded to the image forming apparatus 11A is present or not (step S1003).

When no newly arrived e-mail message forwarded to the image forming apparatus 11A is present ("No" in step S1003), the TCP connection with the mail server 53A is disconnected (step S1011), and the present routine ends.

On the other hand, when such a newly arrived e-mail message is present ("Yes" in step S1003), the newly arrived e-mail message is downloaded from the mail server 53A according to POP3 (post office protocol version 3). It should be noted here that when a plurality of newly arrived e-mail messages are present, the newly arrived e-mail messages are downloaded one at a time in the order of arrival.

When the download of the e-mail messages is completed, an instruction is given to delete original e-mail messages corresponding to the downloaded e-mail messages from the mail server 53A (a "Delete" command is output to the mail server 53A) (step S1007), and the TCP connection with the mail server 53A is disconnected (step S1009).

Following this, a judgment is performed as to whether a firmware piece is attached to any downloaded e-mail message or not, by referring to a field body of the field "Content-Description" in each e-mail message (step S1021).

When a firmware piece is attached to a downloaded e-mail message ("Yes" in step S1021), US-ASCII characters are extracted from the body of the e-mail message (step S1031). The extracted US-ASCII characters are then subjected to the inverse-Base64 conversion, to restore the data to binary data (step S1033). Also, a control module number is read from a field body of the field "Subject" in the header of the e-mail message (step S1035).

The firmware piece converted into the binary data is stored into the disk unit 205 (step S1037). As a firmware rewrite job, a process for rewriting a firmware piece in a target flash ROM to the firmware piece for a rewrite purpose stored in the disk unit 205 is registered at the last line in the job management table (FIG. 8A) (step S1039). Here, as described above, a number "2" indicating that the registered job is a firmware rewrite job is registered into the "job type" field, a control module number of a rewrite target and a symbol indicating whether the firmware piece is a program firmware piece or a parameter firmware piece (namely, a symbol "PRG" for a program firmware piece and a symbol "DAT" for a parameter firmware piece) is registered into the "additional information" field, and a storage address of the firmware piece in the disk unit 205 is registered into the "address" field.

When the judgment result in step S1121 shows that a firmware piece is not attached to any downloaded e-mail message, a normal process to be executed for an e-mail message to which a firmware piece is not attached is executed on each downloaded e-mail message (step S1241), and the present routine ends. Because the processing in step S1241 is not directly related to the gist of the present invention, it is not described here.

Referring back to FIG. 11, when the above-described processing in step S943 is completed, or when the judgment result in step S941 shows that the checking interval has not passed, a judgment is performed as to whether the image forming apparatus 11A is in the "READY" state or in the "BUSY" state (step S951). When the image forming apparatus 11A is in the "READY" state ("No" in step S951), a judgment is performed as to whether a job is registered in the management table or not (step S961). When a job is registered therein ("Yes" in step S961), the processing advances to step S963, where a process for making the image forming apparatus execute the job is executed.

Figure 14:
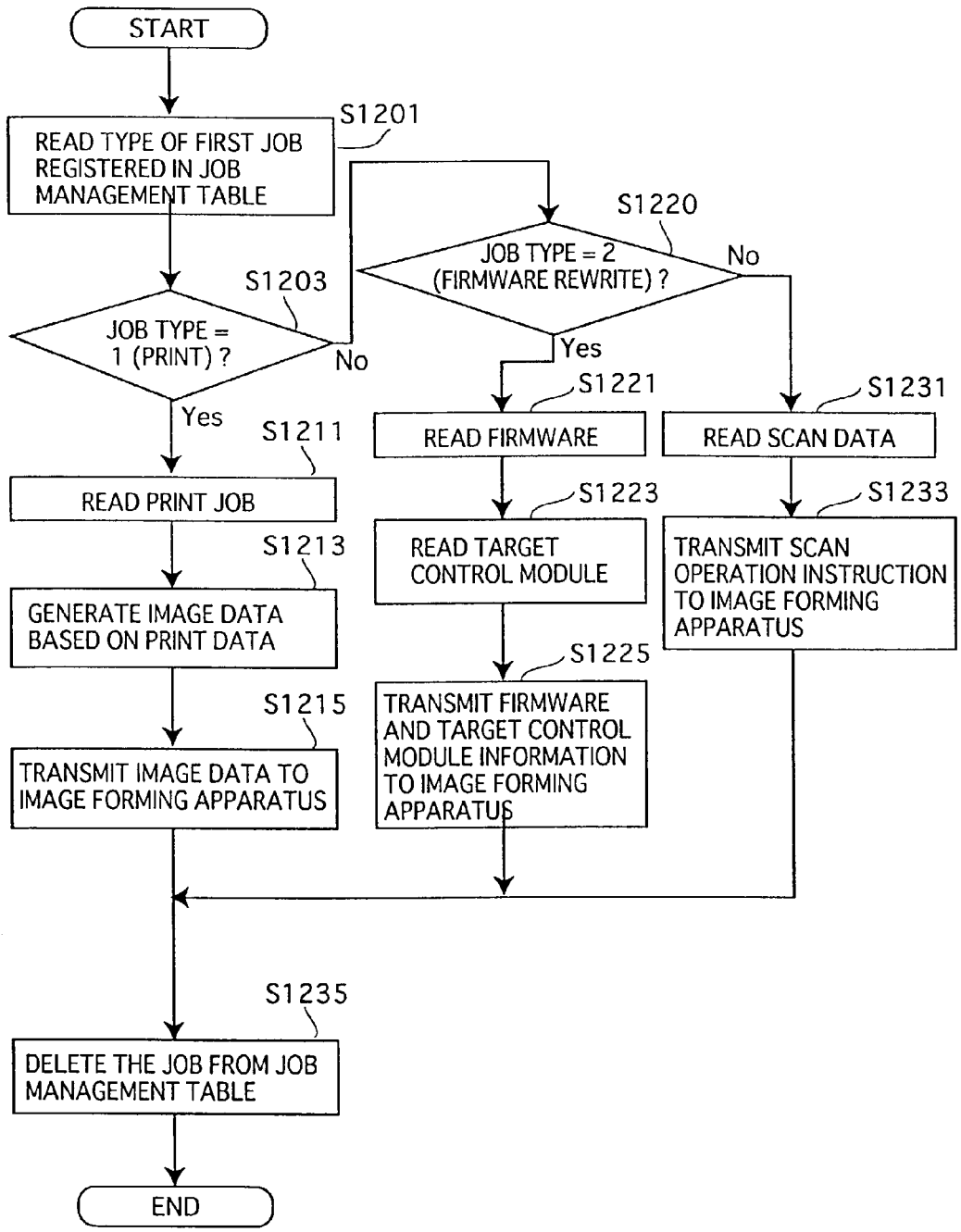
FIG. 14 is a flowchart showing a job transmission process executed by the printer controller relating to the first embodiment for transmitting a job to the image forming apparatus.

FIG. 14 is a flowchart showing the processing in step S963 in detail.

First, a type of a job registered at the first line in the job management table is read (step S1201). According to the type of the job, processing suitable for the job type is executed in the following way.

When the type of the job is a print job ("Yes" in step S1203), the print job is read from the disk unit 205 by referring to an address stored in the job management table (step S1211). Based on the read print job, bitmap data (image data) is generated (step S1213). The generated image data is transmitted to the image forming apparatus 11A, and the image forming apparatus 11A is instructed to execute the print job (step S1215).

When the type of the job is a firmware rewrite job ("No" in step S1203 and "Yes" in step S1220), a firmware piece is read from the disk unit 205 by referring to an address stored in the job management table (step S1221). From the job management table, a module number of the rewrite target control module and a type of a firmware piece either being a program firmware piece or a parameter firmware piece (PRG or DAT) are read (step S1223). The module number and the firmware type are attached to the read firmware piece, and the firmware piece is transmitted to the image forming apparatus 11A, so that a firmware piece stored in the corresponding flash ROM is rewritten to the transmitted firmware piece (step S1225).

When the type of the job is a scan job ("No" in both steps S1203 and S1220), scan data including an IP address of a client apparatus that has given the scan request etc., is read (step S1231), and an instruction is given to the image forming apparatus 11A to execute the scan job (step S1233).

When the type of the job is either a print job, a firmware rewrite job, or a scan job, once the job is transmitted to the image forming apparatus 11A or a job execution instruction is given to the image forming apparatus 11A, the corresponding job (the first job) is deleted from the job management table. When other jobs are in an execution queue, these jobs are each moved upward by one line in the execution order (step S1235).

Referring back to FIG. 11, when the judgment result in step S951 shows that the image forming apparatus 11A is in the "BUSY" state ("Yes" in step S951), or when the judgment result in step S951 shows that the image forming apparatus 11A is in the "READY" state ("No" in step S951) but no unprocessed job is registered ("No" in step S961), the processing returns to step S911.

<Process Executed by the Image Forming Apparatus>

Figure 15:
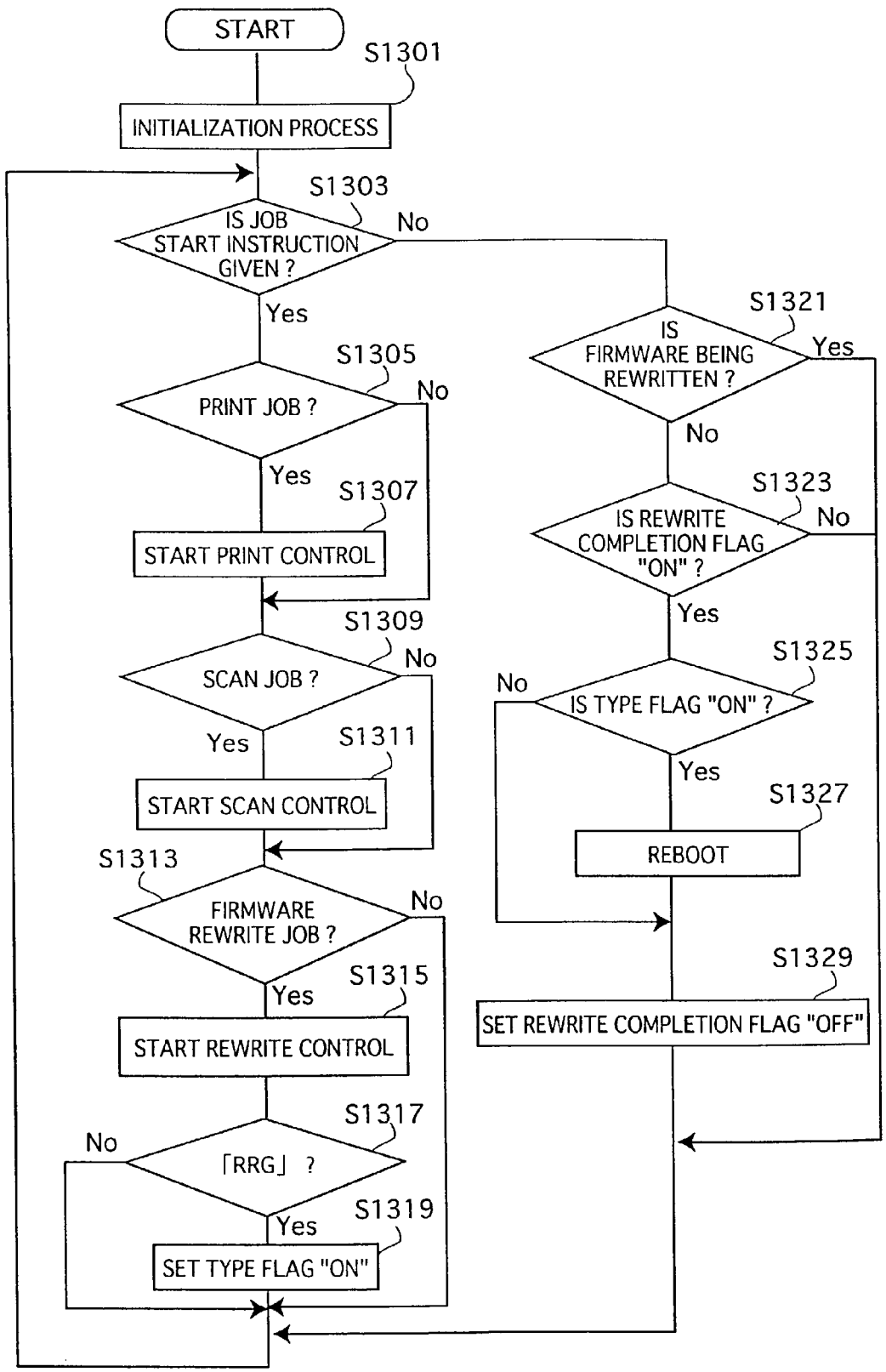
FIG. 15 is a flowchart showing a basic process executed by the image forming apparatus relating to the first embodiment.

FIG. 15 is a flowchart showing a basic process executed by the CPU 111 (FIG. 2) of the control module 1 in the image forming apparatus 11A, at the time of controlling execution of a job.

A program shown in the flowchart is activated by a main switch of the image forming apparatus being turned on. First, a typical initialization process including an initialization of a memory is executed (step S1301). Here, a rewrite completion flag and a type flag provided in the NV-RAM 114 are reset to "OFF". The rewrite completion flag is set "ON" when rewrite of a firmware piece stored in any one of flash ROMs in any one of control modules including the control module 1 is completed. The type flag is set "ON" when the firmware piece that is started to be rewritten is a program firmware piece.

Following the initialization process, a job start instruction is received from the printer controller 21A ("Yes" in step S1303), and processing suitable for a type of the received job is executed in the following way.

When the received job is a print job ("Yes" in step S1305), an instruction is given to the control module 2 and the control module 3 to start execution of the print job (step S1307).

When the received job is a scan job ("Yes" in step S1309), an instruction is given to the control module 3 to start execution of the scan job (step S1311).

When the received job is a firmware rewrite job ("Yes" in step S1313), firmware rewrite control is started (step S1315).

Figure 16:
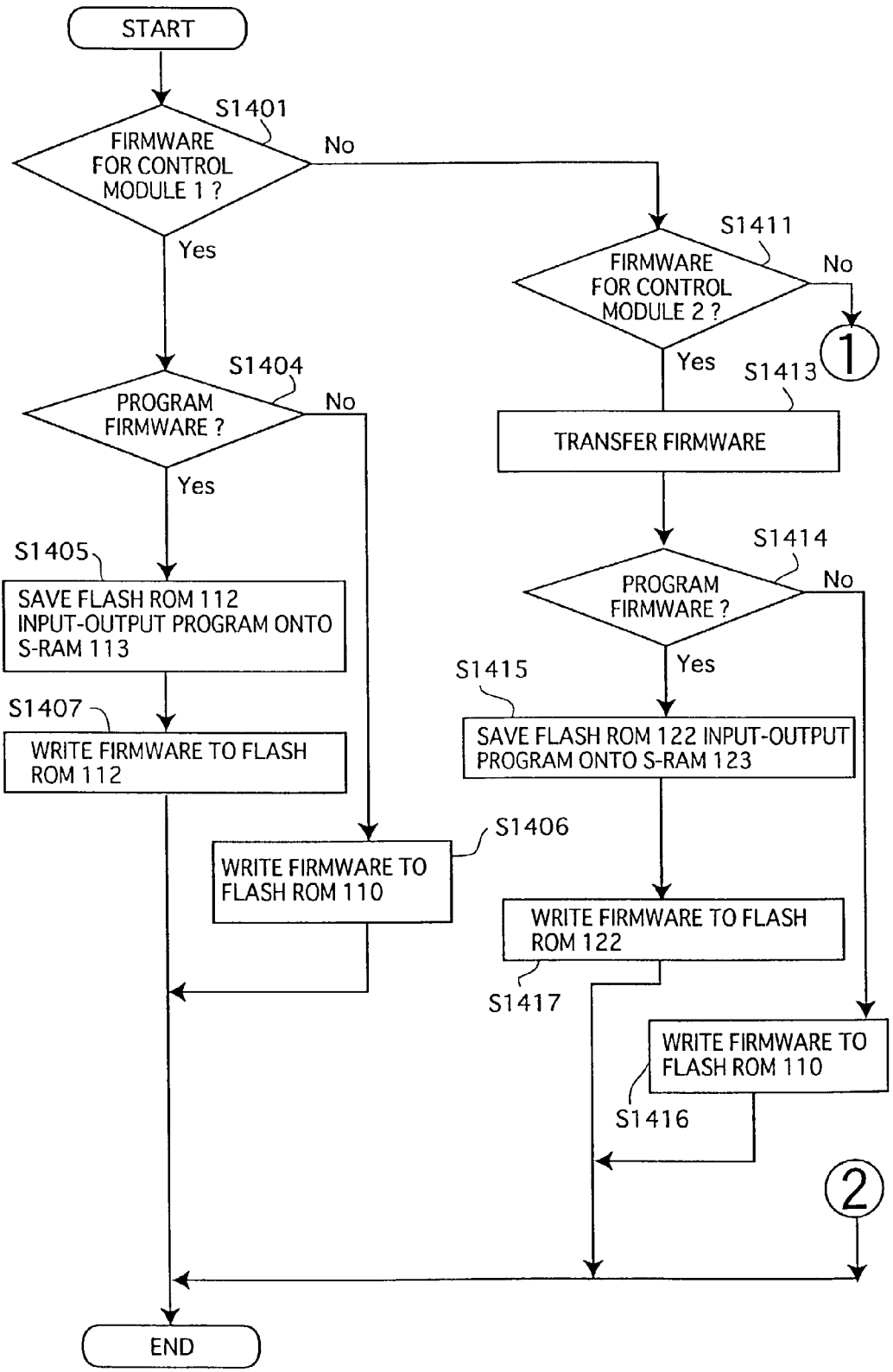
FIG. 16 is a part of the flowchart showing a firmware rewrite process executed by the image forming apparatus relating to the first embodiment.
Figure 17:
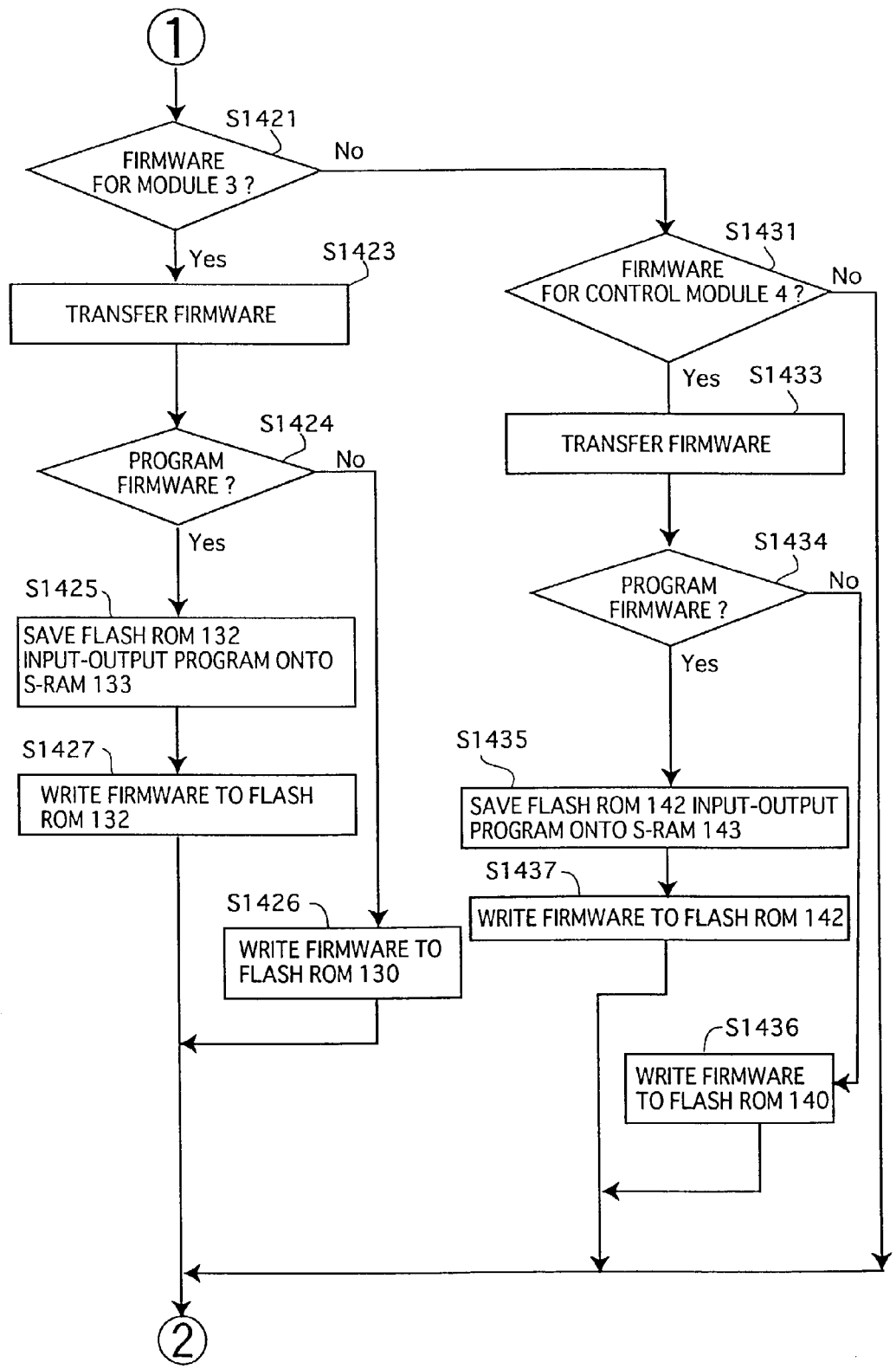
FIG. 17 is a part of the flowchart showing the firmware rewrite process executed by the image forming apparatus relating to the first embodiment.

FIGS. 16 and 17 are a flowchart showing a firmware rewrite process executed in the image forming apparatus 11A.

First, a judgment is performed as to whether the received firmware piece is intended for the control module 1 or not (step S1401). When the received firmware piece is intended for the control module 1 ("Yes" in step S1401), a type of the firmware piece is judged (step S1404). When the firmware piece is a program firmware piece ("Yes" in step S1404), an input-output program stored in the flash ROM 112 is saved onto the S-RAM 113 (step S1405). According to the saved input-output program (the input-output program in the S-RAM 113), a firmware piece for a rewrite purpose (a new firmware piece) is written to the flash ROM 112 (step S1407). On the other hand, when the received firmware piece is a parameter firmware piece ("No" in step S1404), the firmware piece is written to the flash ROM 110 (step S1406).

When the received firmware piece is intended for the control module 2 ("No" in step S1401 and "Yes" in step S1411), the firmware piece is transferred to the control module 2 (step S1413). When the transferred firmware piece is a program firmware piece ("Yes" in step S1414), the input-output program stored in the flash ROM 122 is saved onto the S-RAM 123 (step S1415). According to the saved input-output program, a firmware piece for a rewrite purpose is written to the flash ROM 122 (step S1417). On the other hand, when the firmware piece is a parameter firmware piece ("No" in step S1414), the parameter firmware piece is written to the flash ROM 110 (step S1416).

When the received firmware piece is intended for the control module 3 ("No" in both steps S1401 and S1411, and "Yes" in step S1421), the firmware piece is transferred to the control module 3 (step S1423). When the transferred firmware piece is a program firmware piece ("Yes" in step S1424), the input-output program stored in the flash ROM 132 is saved onto the S-RAM 133 (step S1425). According to the saved input-output program, a firmware piece for a rewrite purpose is written to the flash ROM 132 (step S1427). On the other hand, when the firmware piece is a parameter firmware piece ("No" in step S1424), the parameter firmware piece is written to the flash ROM 130 (step S1426).

When the received firmware piece is intended for the control module 4 ("No" in steps S1401, S1411, and S1421, and "Yes" in step S1431), the firmware piece is transferred to the control module 4 (step S1433). When the transferred firmware piece is a program firmware piece ("Yes" in step S1434), the input-output program stored in the flash ROM 142 is saved onto the S-RAM 143 (step S1435). According to the saved input-output program, a firmware piece for a rewrite purpose is written to the flash ROM 142 (step S1437). On the other hand, when the firmware piece is a parameter firmware piece ("No" in step S1434), the parameter firmware piece is written to the flash ROM 140 (step S1436).

When the received firmware piece is not intended for any of the control modules 1 to 4 ("No" in steps S1401, S1411, S1421, and S1431), the processing ends.

When the rewrite of the firmware piece is completed, the above-described rewrite completion flag is set "ON". In the case where such rewrite of a firmware piece is performed in the control module 1, the CPU 111 sets the rewrite completion flag "ON" when judging to do so. In the case where such rewrite of a firmware piece is performed in the control modules 2 to 4, the CPU 111 sets the rewrite completion flag "ON" upon receipt of a rewrite completion notification from the control modules 2 to 4.

Referring back to FIG. 15, the rewrite control is started (step S1315). Here, when the firmware piece that is presently being rewritten is a program firmware piece ("Yes" in step S1317), the type flag is set "ON". When the firmware piece that is presently being rewritten is a parameter firmware piece ("No" in step S1317), the type flag remains to be "OFF" (step S1319 is skipped).

When no instruction to start a job is given ("No" in step S1303), a judgment is performed as to whether a firmware piece is presently being rewritten or not (step S1321). When a firmware piece is presently being rewritten ("Yes" in step S1321), the processing returns to step S1303.

On the other hand, when a firmware piece is not presently being rewritten ("No" in step S1321), the rewrite completion flag is referred to (step S1323). When the rewrite completion flag is "OFF" ("No" in step S1323), the processing returns to step S1303.

When the rewrite completion flag is "ON" ("Yes" in step S1323), the type flag is referred to (step S1325). When the type flag is "ON" ("Yes" in step S1325), i.e., when the firmware piece that has been rewritten is a program firmware piece, the image forming apparatus 11A is rebooted (step S1327) (rebooting the apparatus results in both the type flag and the rewrite completion flag being reset to "OFF").

When the type flag is "OFF" ("No" in step S1325), i.e., when the firmware piece that has been rewritten is a parameter firmware piece, the rewrite completion flag is set "OFF" (step S1329), and the processing returns to step S1303.

As described above, according to the first embodiment, when both an image processing job, such as a print job and a scan job, and a firmware rewrite job are registered in the job management table, the execution order of the image processing job and the firmware rewrite job is adjusted in accordance with a type of a firmware piece relating to the firmware rewrite job. To be more specific, when the registered firmware piece is a program firmware piece (a firmware piece that corresponds to a program part), the execution order is adjusted in such a manner that the image processing job precedes the program firmware rewrite job. When the registered firmware piece is a parameter firmware piece (a firmware piece that corresponds to a control parameter part), the parameter firmware rewrite job and the image processing job are executed (processed) as normal in the order of reception.

As a result of this, such a case can be avoided where an image processing job is delayed long due to a series of program firmware rewrite processing that generally requires long time including a rebooting time of the image forming apparatus.

Also, the above embodiment describes the case where a parameter firmware rewrite job is executed as normal in the order of reception. However, when a parameter firmware rewrite job and an image processing job are in an execution queue, the execution order may be adjusted in such a manner that the parameter firmware rewrite precedes the image processing job. This is due to the following reasons. A parameter firmware rewrite job does not involve rebooting of the image processing apparatus so requires shorter processing time than a program firmware rewrite job, and also, it requires shorter processing time than an image processing job. In addition to this, the image processing job being executed after rewrite of a parameter firmware piece usually turns out to produce a higher image quality than being executed before rewrite of a parameter firmware piece. In this case, instead of always reading the first job out of jobs registered in the job management table in step S1201, the "additional information" field for each of the registered jobs is referred to in the order of registration. Then, when a parameter firmware rewrite job is found, the job found is read first.

Second Embodiment

A second embodiment of the present invention is basically the same as the first embodiment with the only difference being in the following two points.

(1) In the second embodiment, a firmware piece is stored in a flash ROM as being composed of a program part and a control parameter part that are integrated together. Also, a firmware piece for a rewrite purpose is not categorized as a program firmware piece or a parameter firmware piece, and is distributed from the service center as an integration of a program part and a control parameter part.

(2) In the second embodiment, such rearrangement of the job management table as described in the first embodiment (step S927 in FIG. 11, and FIG. 12) is not performed. Instead, as described later, a firmware rewrite job and an image processing job are executed in parallel as the case may be.

Accordingly, the present embodiment is described focusing only on constructions and processing that realize the above differences and that are not provided in the first embodiment. Constructions and processing common to the first embodiment are not described here, and drawings for those common constructions and processing are not provided.

Figure 18:
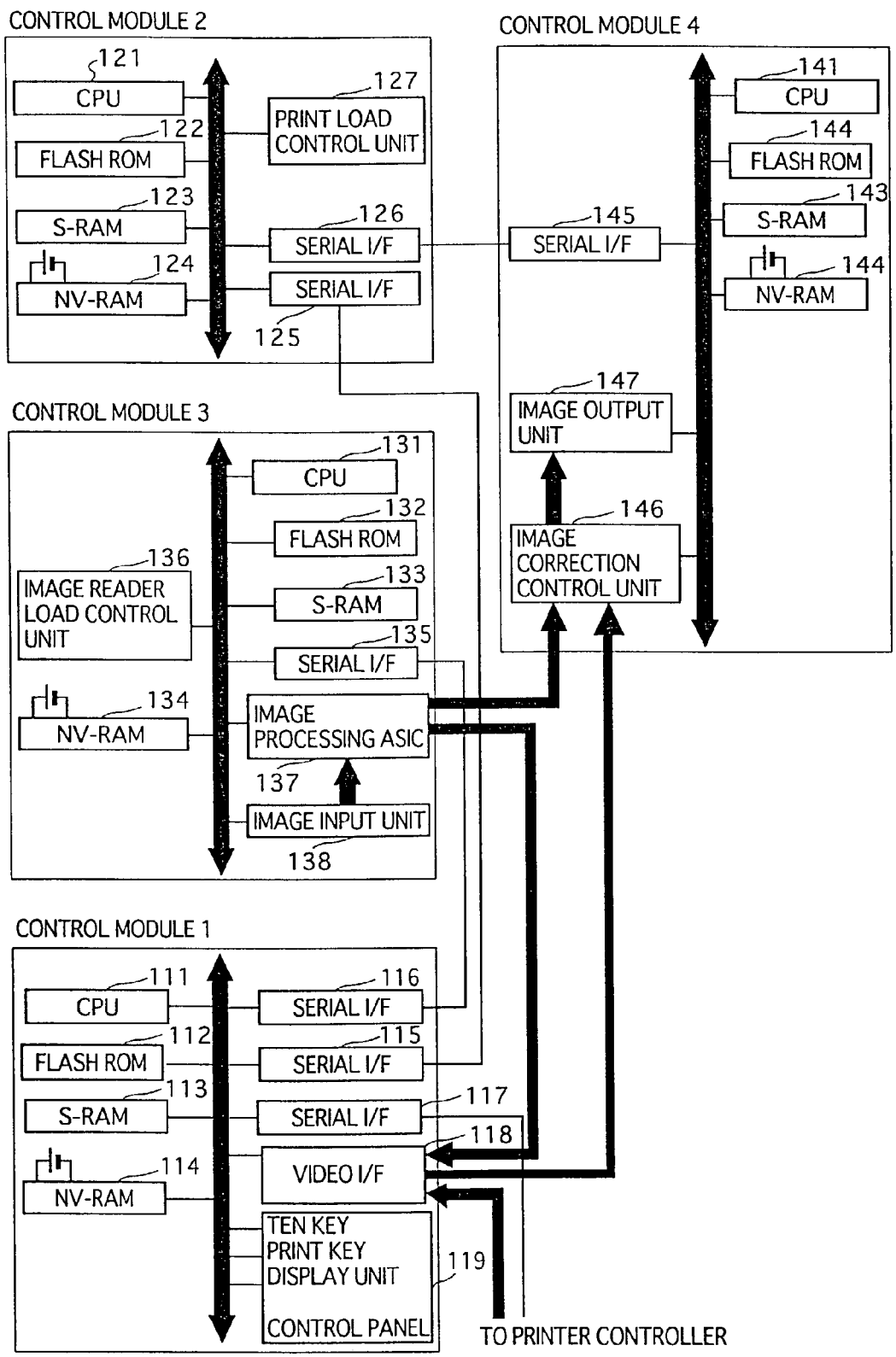
FIG. 18 is a block diagram showing an overall construction of a control part of an image forming apparatus relating to a second embodiment of the present invention.

FIG. 18 is a block diagram showing a construction of a control part of an image forming apparatus relating to the second embodiment, and corresponds to FIG. 2 in the first embodiment. In the second embodiment, a firmware piece handled by a control module is composed of a program part and a control parameter being integrated together as described above. Such firmware pieces are stored in flash ROMs 112, 122, 132, and 142 in control modules 1 to 4. Besides, the flash ROMs 110, 120, 130, and 140 provided specially for storing a parameter firmware piece in each control part of each image forming apparatus in the first embodiment are not provided in the second embodiment. Except these points, the second embodiment is the same as the first embodiment, and so components in the second embodiment that are the same as the components in the first embodiment are given the same reference numerals and are not described here.

Figure 19:
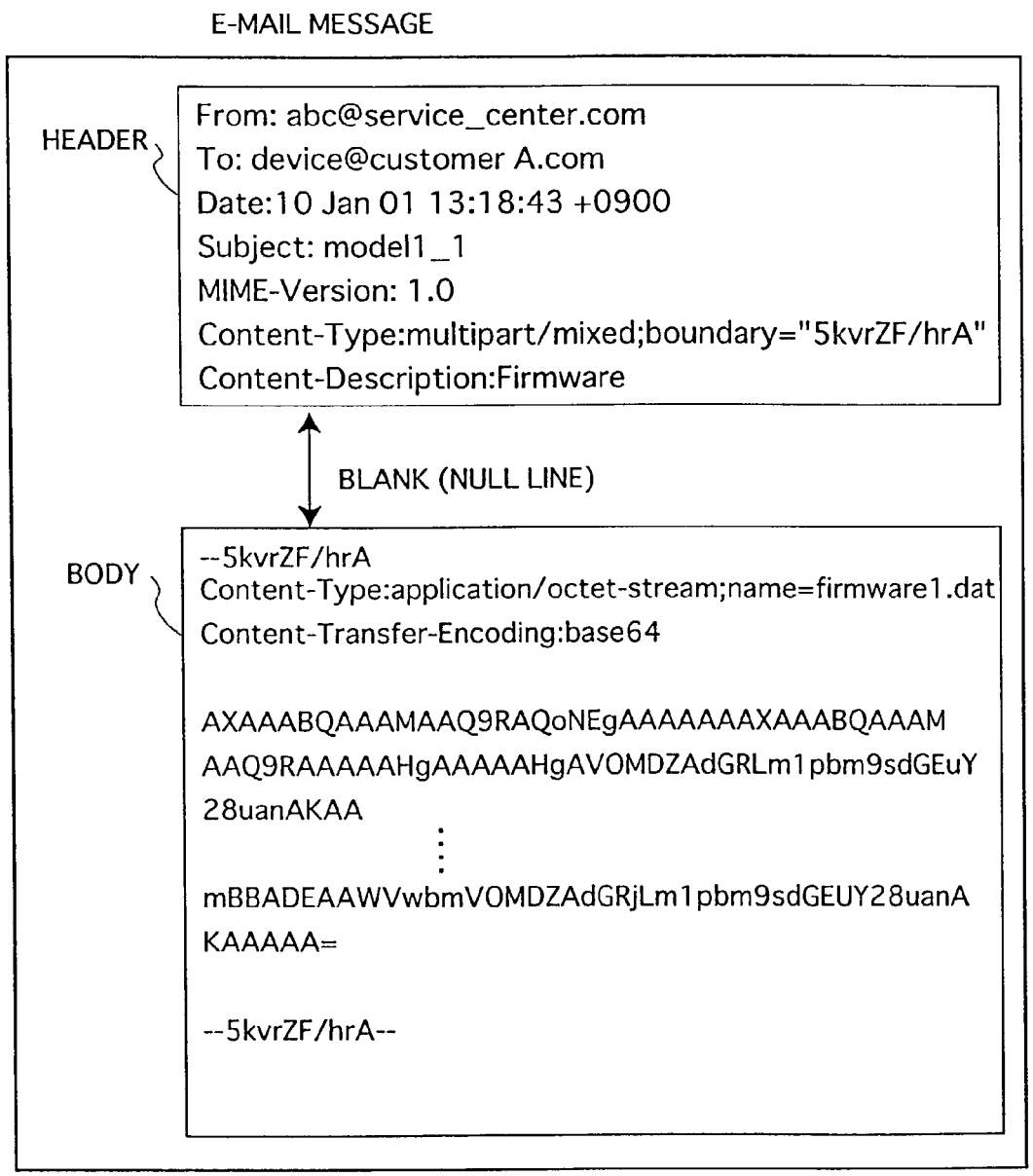
FIG. 19 shows one example of an e-mail message to which a firmware piece is attached that is generated by a center apparatus and distributed to the image forming apparatus in the second embodiment.

Because a firmware piece in the present embodiment has an integrated construction as described above, a field body of the field "Content-Description" in an e-mail message generated in the center apparatus does not contain a description of "PRG" or "DAT", but simply contains a description of "firmware" as shown in FIG. 19.

Also, in a job management table in a printer controller, only a control module number is registered into an "additional information" field for a firmware piece as shown in FIG. 20A.

Figure 21:
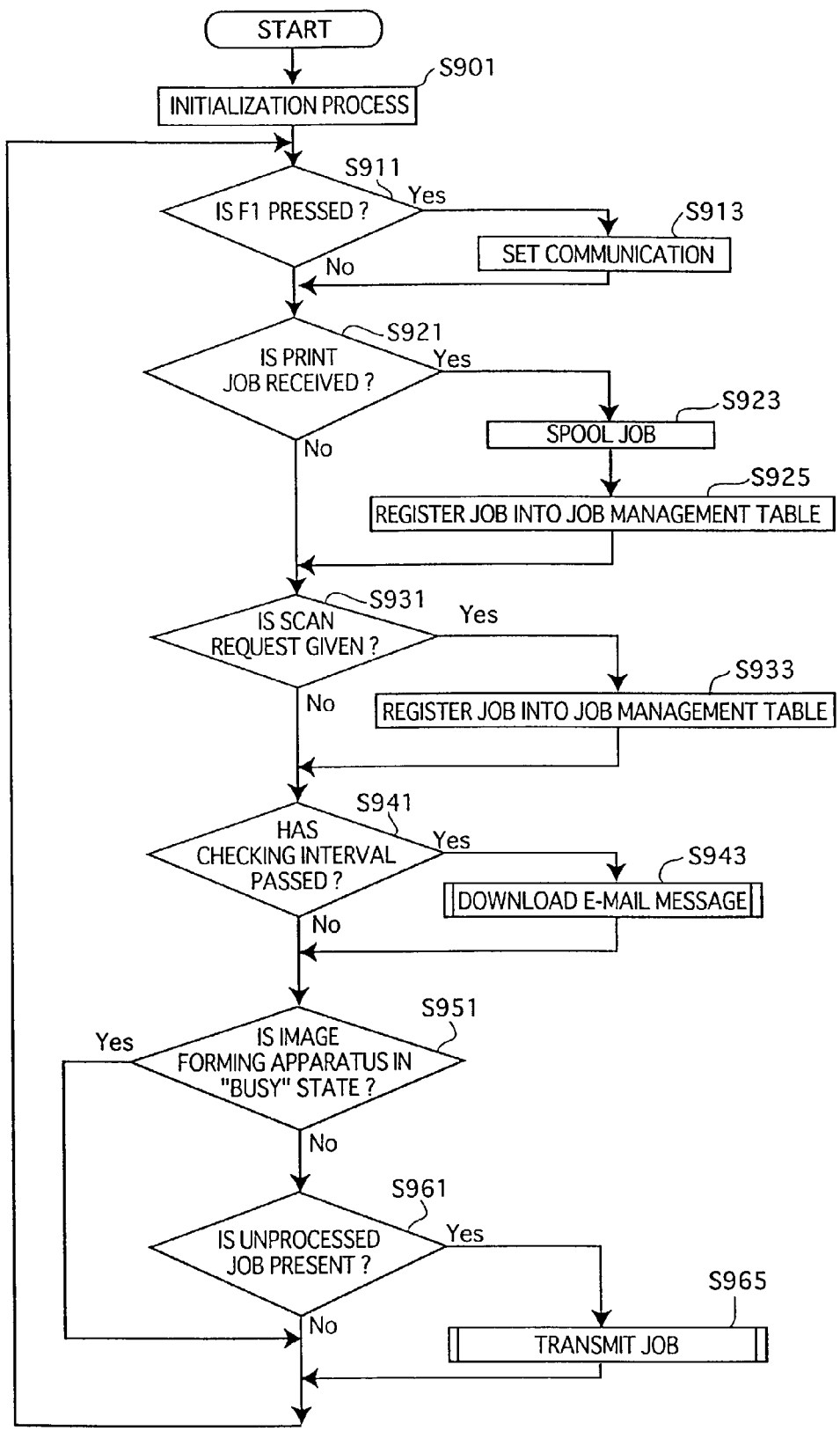
FIG. 21 is a flowchart showing a basic process executed by the printer controller relating to the second embodiment.

Further, as shown in FIG. 21, a basic process executed by the printer controller in the second embodiment is the basic process (see FIG. 11) in the first embodiment from which the job management table rearrangement process (steps S927 and S935) has been removed. Except this, the process in FIG. 21 is the same as the process in the first embodiment (FIG. 11), and so steps in FIG. 21 that are the same as the steps in FIG. 11 are given the same step numbers, and are not described here.

In the second embodiment, in the flowchart shown in FIG. 21, when the image forming apparatus is in a state capable of starting execution of a new job ("No" in step S951), and when unprocessed jobs are present ("Yes" in step S961), two jobs, out of jobs registered in the job management table (unprocessed jobs) can be transmitted consecutively to the image forming apparatus, depending on a combination of the two jobs (step S965).

Figure 22:
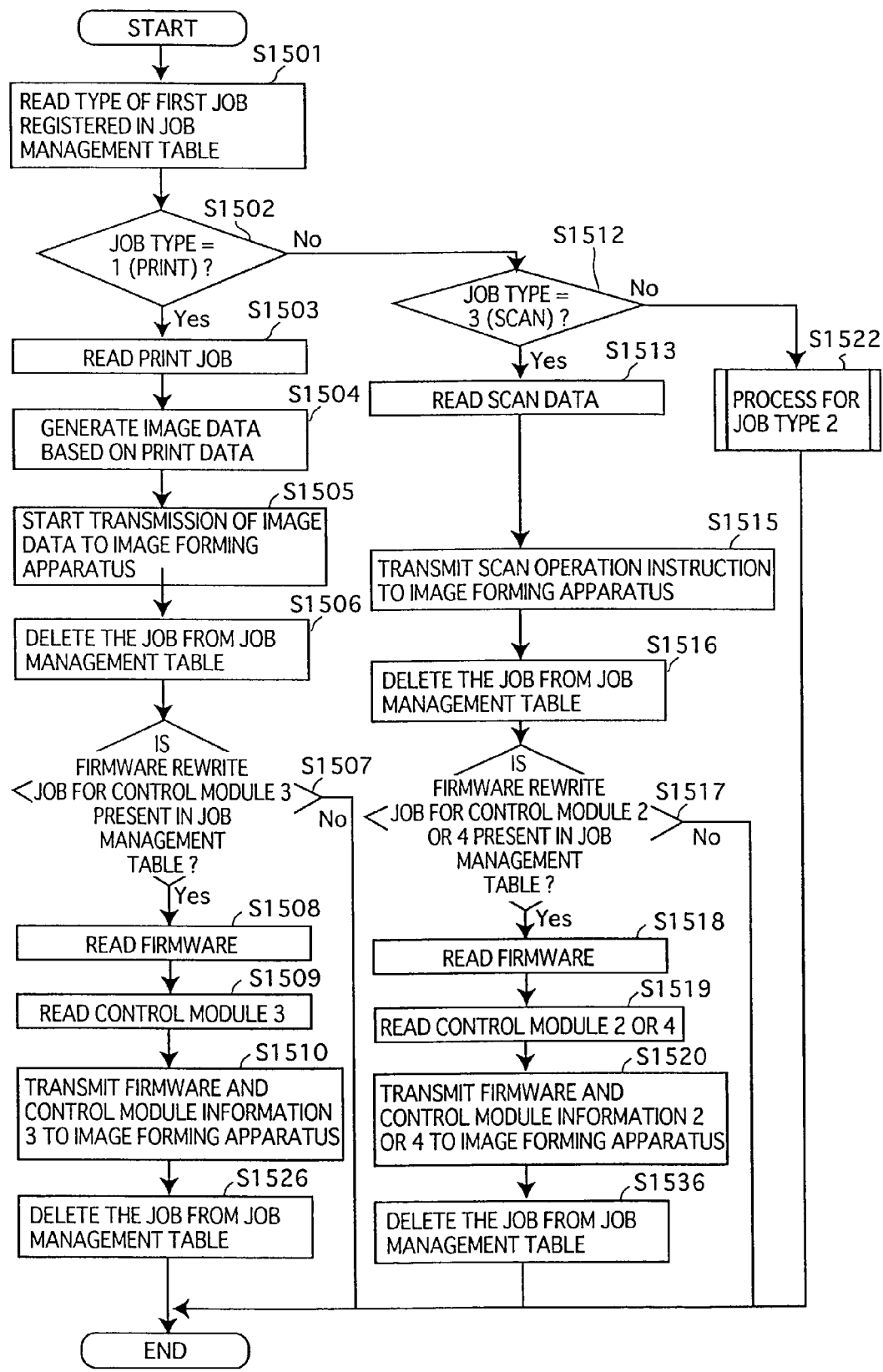
FIG. 22 shows a part of a flowchart showing a job transmission process executed by the printer controller relating to the second embodiment for transmitting a job to the image forming apparatus.
Figure 23:
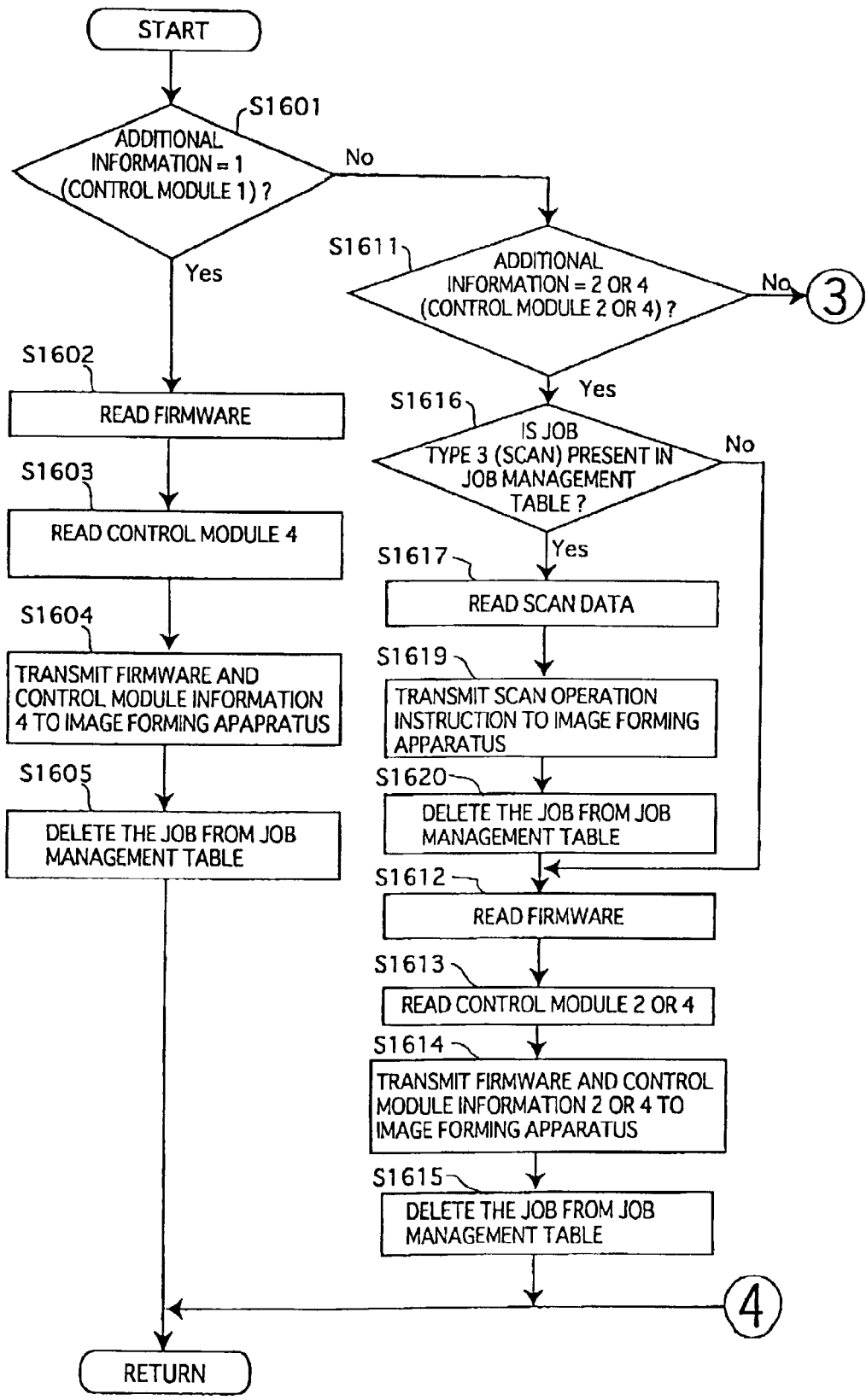
FIG. 23 is a part of the flowchart showing the job transmission process executed by the printer controller relating to the second embodiment for transmitting a job to the image forming apparatus.
Figure 24:
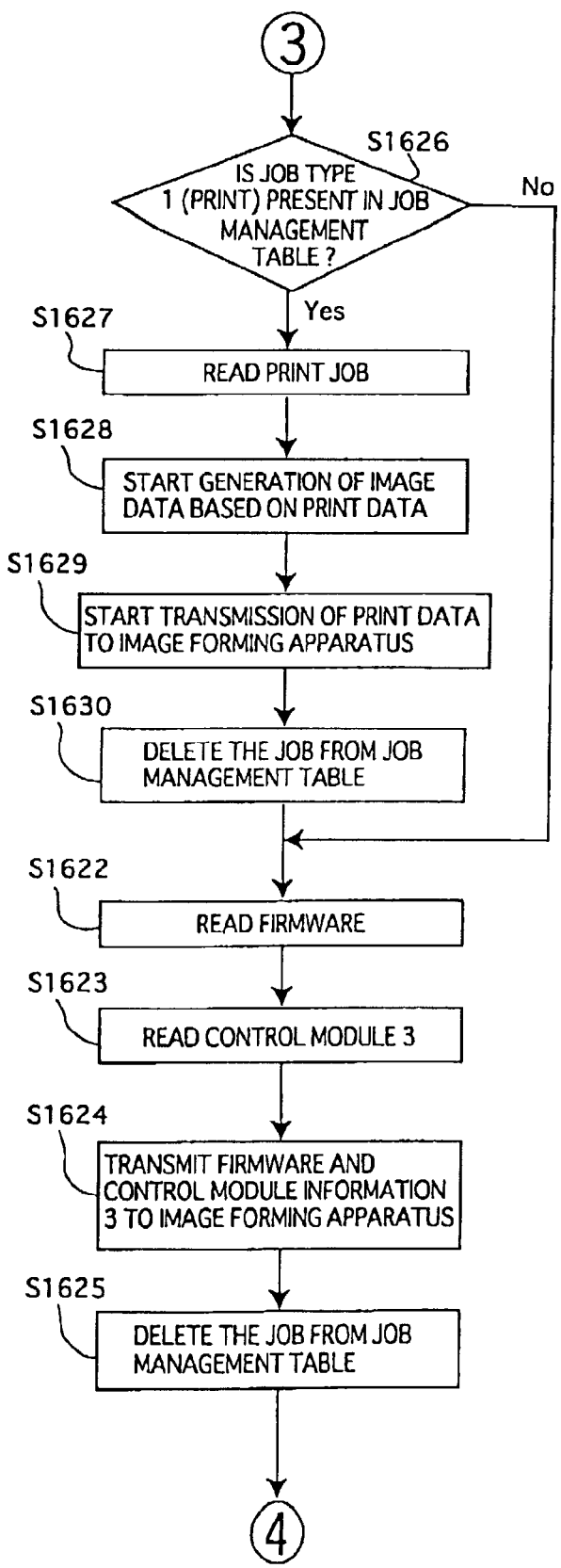
FIG. 24 is a part of the flowchart showing the job transmission process executed by the printer controller relating to the second embodiment for transmitting a job to the image forming apparatus.

The following describes a job transmission process in the second embodiment in detail, with reference to a flowchart shown in FIGS. 22 to 24.

First, a type of a job that is registered at the first line in the job management table is read (step S1501). According to the type of the job, processing suitable for the job type is executed in the following way.

When the type of the job is a print job ("Yes" in step S1502), the corresponding print job is read from the disk unit 205 (step S1503). Based on the read print job, bitmap data (image data) is generated (step S1504). The generated image data is transmitted to the image forming apparatus 11A, and the image forming apparatus 11A is instructed to execute the print job (step S1505), and also, the print job is deleted from the job management table (step S1506).

Following this, types of jobs registered in the job management table are sequentially referred to from the first line. When a firmware rewrite job intended for the control module 3 is found ("Yes" in step S1507), the corresponding firmware piece is read from the disk unit 205 (step S1508), a control module number "3" is read from the job management table (step S1509), and the module number "3" is attached to the read firmware piece, and the firmware piece is transmitted to the image forming apparatus, so that rewrite of a firmware piece stored in the corresponding flash ROM is executed (step S1510). Here, the firmware rewrite job is deleted from the job management table (step S1526). When no firmware rewrite job is found in the job management table ("No" in step 1507), steps S1508, S1509, S1510, and S1526 are skipped.

When the type of the job is a scan job ("No" in step S1502 and "Yes" in step S1512), scan data including an IP address of a client apparatus that has given the scan request etc., is read (step S1513), and the image forming apparatus 11A is instructed to execute the scan job (step S1515). Here, the scan job is deleted from the job management table (step S1516).

Following this, types of jobs registered in the job management table are sequentially referred to from the first line. When a firmware rewrite job intended for the control module 2 or 4 is found ("Yes" in step S1517), the corresponding firmware piece is read from the disk unit 205 (step S1518), a control module number ("2" or "4") is read from the job management table (step S1519), and the read module number is attached to the read firmware piece, and the firmware piece is transmitted to the image forming apparatus, so that rewrite of a firmware piece stored in the corresponding flash ROM is executed (step S1520). Here, the firmware rewrite job is deleted from the job management table (step S1526). When no firmware rewrite job is found in the job management table ("No" in step 1517), steps S1518, S1519, S1520, and S1536 are skipped.

The following describes the processing (in step S1522) executed when a job registered at the first line in the job management table is a firmware rewrite job ("No" in both steps S1502 and S1512), with reference to FIGS. 23 and 24.

To execute a firmware rewrite job, processing according to its additional information, i.e., a rewrite target control module, is executed in the following way.

When the rewrite target control module is the control module 1 ("Yes" in step S1601), a print job or a scan job cannot be executed in parallel with the firmware rewrite job because the control module 1 is provided for comprehensively controlling the entire image forming apparatus. Therefore, only the firmware rewrite job is executed. To be more specific, the corresponding firmware piece is read from the disk unit 205 (step S1602), and a control module number "1" is read from the job management table (step S1603), the module number "1" is attached to the read firmware piece, and the firmware piece is transmitted to the image forming apparatus, so that a firmware piece stored in the corresponding flash ROM is rewritten to the transmitted firmware piece (step S1604). Here, the firmware rewrite job is deleted from the job management table (step S1605).

When the rewrite target control module is the control module 2 or 4 ("No" in step S1601 and "Yes" in step S1611), types of jobs registered in the job management table are sequentially referred to from the first line. When a scan job is found ("Yes" in step S1616), scan data including an IP address of a client apparatus that has given the scan request etc., is read (step S1617), and the image forming apparatus 11A is instructed to execute the scan job (step S1619). Here, the scan job is deleted from the job management table (step S1620).

Following this, the corresponding firmware piece is read from the disk unit 205 (step S1612), a control module number ("2" or "4") is read from the job management table (step S1613), the read module number is attached to the read firmware piece and the firmware piece is transmitted to the image forming apparatus, so that a firmware piece stored in the corresponding flash ROM is rewritten to the transmitted firmware piece (step S1614). Here, the firmware rewrite job is deleted from the job management table (step S1615).

When no scan job is found in the job management table ("No" in step S1616), only the firmware rewrite job is transmitted (steps S1619 and S1620 are skipped).

When the rewrite target control module is the control module 3 ("No" in steps S1601 and S1611), types of jobs registered in the job management table are sequentially referred to from the first line. When a print job is found ("Yes" in step S1626), the corresponding print job is read from the disk unit 205 (step S1627), and bitmap data (image data) is generated based on the read print job (step S1628). The generated image data is transmitted to the image forming apparatus 11A, and the image forming apparatus 11A is instructed to execute the print job (step S1629). Here, the print job is deleted from the job management table (step S1625).

Following this, the corresponding firmware piece is read from the disk unit 205 (step S1622), a control module number "3" is read from the job management table (step S1623), and the module number "3" is attached to the read firmware piece, and the firmware piece is transmitted to the image forming apparatus, so that a firmware piece stored in the corresponding flash ROM is rewritten to the transmitted firmware piece (step S1624). Here, the firmware rewrite job is deleted from the job management table (step S1625).

When no print job is found in the job management table ("No" in step 1626), only the firmware rewrite job is transmitted (steps S1627 to S1630 are skipped).

In the job transmission process described above, for example, when the registration state of the job management table is as shown in FIG. 20A, a print job with a job number 1 is executed in parallel with a firmware rewrite job with a job number 6.

When the registration state of the job management table is as shown in FIG. 20B as job processing advances, a firmware rewrite job with a job number 1 is executed in parallel with a scan job with a job number 3.

Figure 25:
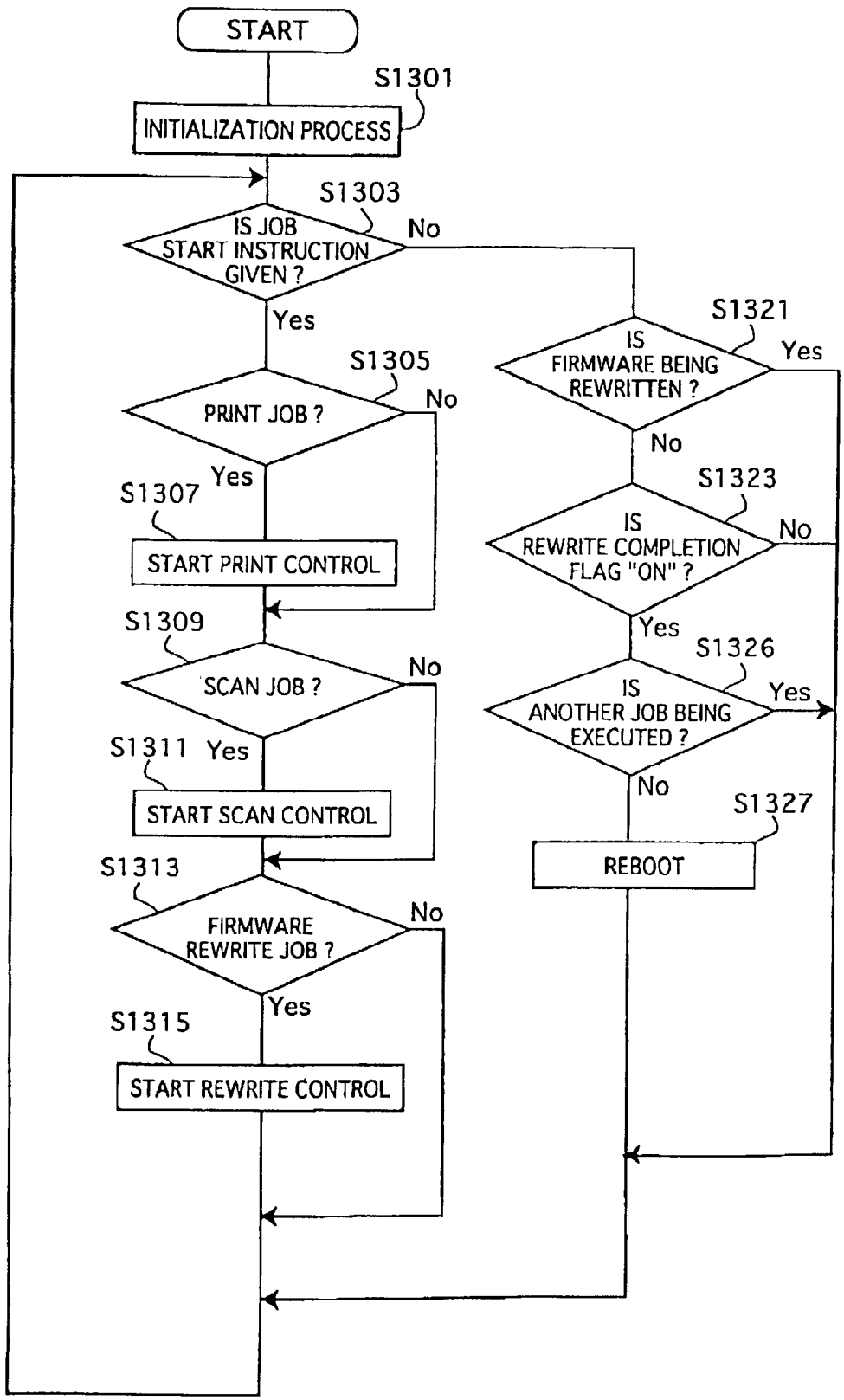
FIG. 25 is a flowchart showing a basic process executed by the image forming apparatus relating to the second embodiment.

FIG. 25 is a flowchart showing a basic process executed by the CPU 111 of the control module 1 in the image forming apparatus 11A, and corresponds to the flowchart in FIG. 15 in the first embodiment. It should be noted here that steps in this flowchart that are the same as the steps in the flowchart in FIG. 15 in the first embodiment are given the same step numbers, and are not described here. The flowchart shown in FIG. 25 is the flowchart shown in FIG. 15 from which a process executed depending on whether a firmware piece is either a program firmware piece or a parameter firmware piece (namely, steps S1317, S1319, S1325, and S1329 in FIG. 15) has been removed. In the second embodiment, there are cases where a firmware rewrite job and an image processing job (a print job or a scan job) are executed in parallel. Therefore, when execution of a firmware rewrite job is completed ("Yes" in step S1323), a judgment is performed as to whether another job is presently being executed or not (step S1326) before the image forming apparatus is rebooted (step S1327). After it is ensured that another job is not being executed ("Yes" in step S1326), the image forming apparatus is rebooted.

Figure 26:
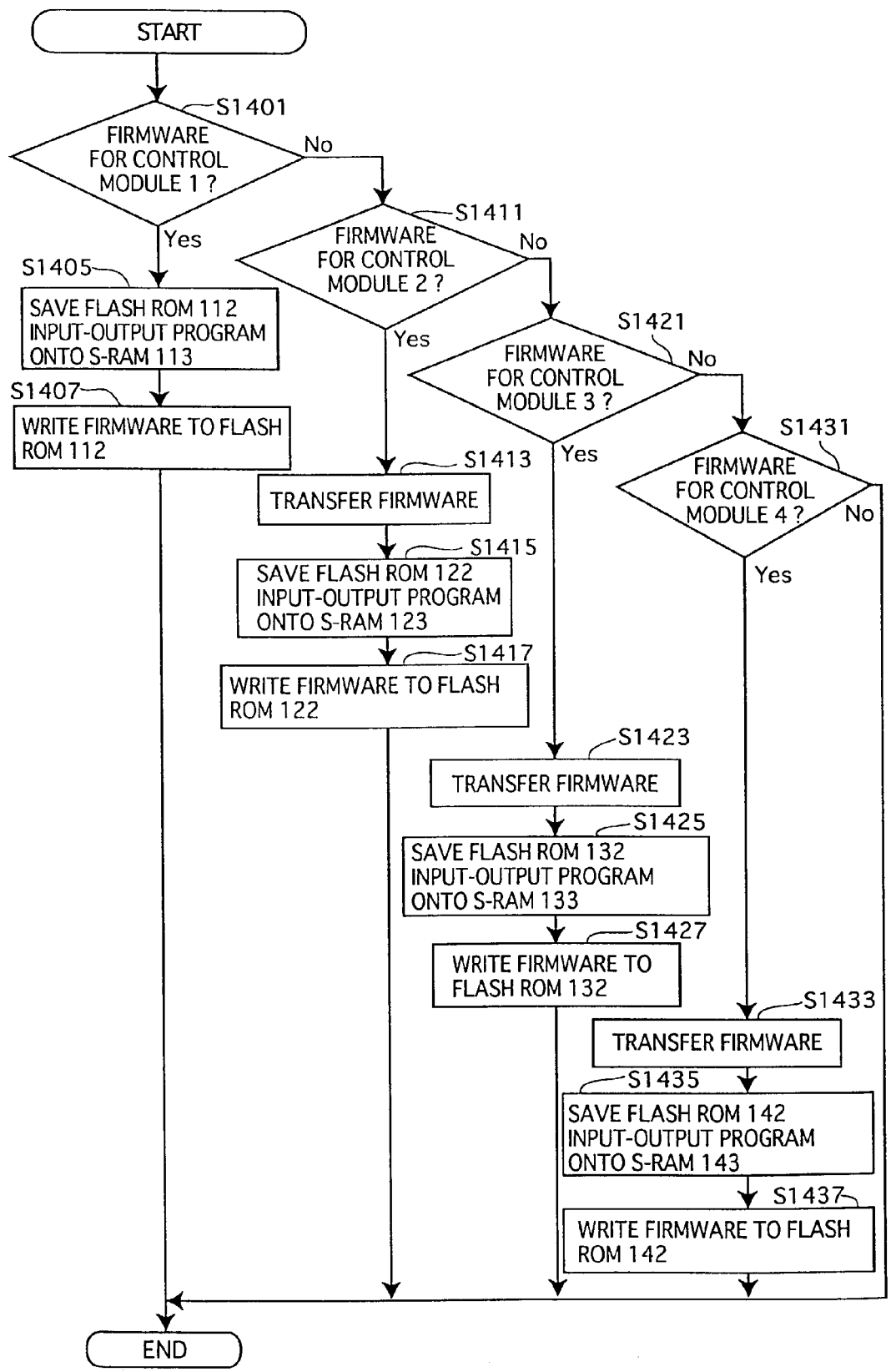
FIG. 26 is a flowchart showing a firmware rewrite process executed by the image forming apparatus relating to the second embodiment.

FIG. 26 is a flowchart showing a firmware rewrite process executed by the image forming apparatus 11A using a firmware piece transmitted from the printer controller 21A, and corresponds to the flowchart shown in FIGS. 16 and 17 in the first embodiment.

The process shown in this flowchart is the process described with reference to FIGS. 16 and 17 in the first embodiment from which the step of judging a type of a firmware piece (steps S1404 and S1414 in FIG. 16 and steps S1424 and S1434 in FIG. 17), and the rewrite process for a parameter firmware piece (steps S1406 and S1416 in FIG. 16 and steps S1426 and S1436 in FIG. 17) have been removed. Except this, the process in FIG. 26 is the same as the process in FIGS. 16 and 17, and so steps in this process that are the same as the steps in the process in FIGS. 16 and 17 are given the same step numbers, and are not described here.

As described above, according to the second embodiment, when an image processing job (a scan job or a print job) and a firmware rewrite job intended for a control module that is not involved in execution of the image processing job are placed in an execution queue, the image processing job and the firmware rewrite job are executed in parallel. As a result, occurrence of such a case where an image processing job is delayed long due to a firmware rewrite job presently being executed can be reduced. Accordingly, utilization efficiency of the control part can be improved.

Third Embodiment

In the third embodiment, a firmware piece used for a rewrite purpose by each control module is interrelated with a firmware piece to be used for a rewrite purpose by the other control modules. To be more specific, the following describes an example of such interrelation. Suppose that there are three firmware pieces each of which is intended for a different control module as a rewrite target. In this case, rewrite to only one or two of the three firmware pieces disables a subsequent image processing job to be executed normally. Accordingly, even if an image processing job is in an execution queue after rewrite to one or two of the three firmware pieces is completed, it is necessary to first complete rewrite to all of the three firmware pieces.

Also, in the third embodiment, unlike in the second embodiment, an image forming apparatus does not execute a firmware rewrite job and another job in parallel, but executes one job at a time.

The third embodiment is basically the same as the second embodiment except the above-described differences. Accordingly, the present embodiment is described focusing only on constructions and processing that realize the above differences and that are not provided in the second embodiment. Constructions and processing common to the second embodiment are not described here, and drawings for those common constructions and processing are not provided.

Here, such two or more firmware pieces as described above, rewrite to only some of which disables a subsequent image processing job to be executed normally until rewrite to all is completed, are hereafter referred to as "interrelated firmware pieces".

Figure 27:
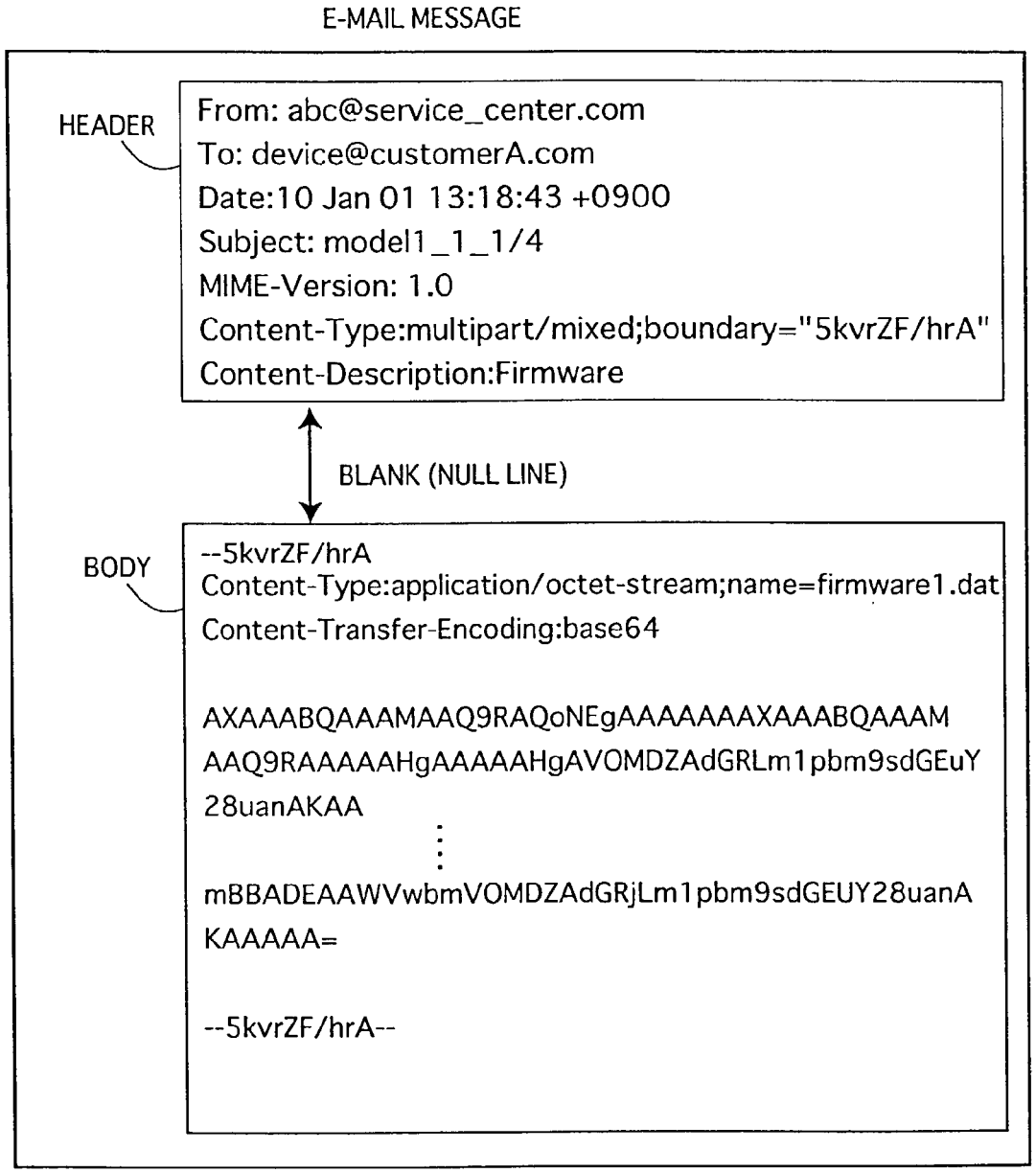
FIG. 27 shows one example of an e-mail message to which a firmware piece is attached that is generated by a center apparatus and distributed to the image forming apparatus in the third embodiment.

In the third embodiment, a field body of the field "Subject" in an e-mail message to which a firmware piece generated at a center apparatus is attached contains a description of interrelation information ("¼" in the present example), beside a description of a model name and a control module number as shown in FIG. 27. The interrelation information indicates that the present firmware piece is one of interrelated firmware pieces. To be more specific, the interrelation information is expressed in a fraction, with a denominator being the number of interrelated firmware pieces, and a numerator being the number of a serial number for the present firmware piece. To be more specific, for example, when the denominator is "4", there are four interrelated firmware pieces, interrelation information for which is "¼", "²⁄₄", "¾", and "⁴⁄₄" respectively. It should be noted here that interrelation information is "¹⁄₁" for a firmware piece for a rewrite purpose that is not an interrelated firmware piece, i.e., a firmware piece, rewrite to which does not disable a subsequent image processing job to be executed normally.

For an interrelated firmware rewrite job, interrelation information is registered beside a rewrite target control module number in an "additional information" field in a job management table in a printer controller in the third embodiment as shown in FIG. 28A.

Also, a "sent" field is newly provided adjacent to the "additional information" field in the job management table in the third embodiment. A use of the "sent" field is described later.

FIG. 29 is a flowchart showing in detail a transmission process in a printer controller in the third embodiment for transmitting a job to an image forming apparatus, and corresponds to the flowchart shown in FIGS. 22 to 24 in the second embodiment.

First, a judgment is performed as to whether a job transmission-impossible indication flag is "ON" or not (step S1101). The job transmission-impossible indication flag is provided in an NV-RAM 204. The job transmission-impossible indication flag is "ON" during a time period from when the transmission process of one of interrelated firmware pieces is started to when the transmission process of all the other interrelated firmware pieces is completed, and is "OFF" at the other times. To be specific, the transmission-impossible indication flag is used to prohibit transmission of an image processing job (a print job or a scan job) once rewrite to one of interrelated firmware pieces is started, until rewrite to all the interrelated firmware pieces is completed.

When the judgment result in step S1101 shows that the job transmission-impossible indication flag is "OFF" ("No" in step S1101), a type of a job registered at the first line in the job management table is read (step S1105). According to the type of the job, processing suitable for the job type is executed in the following way.

When the type of the job is a firmware rewrite job ("Yes" in step S1105), a judgment is performed as to whether interrelation information is registered in the "additional information" field corresponding to the firmware rewrite job (step S1107). When interrelation information is registered ("Yes" in step S1107), the job transmission-impossible indication flag is set "ON" (step S1109). When interrelation information is not registered ("No" in step S1107), step S1109 is skipped, and the processing advances to step S1111.

In step S1111, the corresponding firmware piece is read from the disk unit 205 by referring to an address stored in the job management table. Then, a module number of a rewrite target control module is read from the job management table (step S1113). The module number is attached to the read firmware piece, and the firmware piece is transmitted to the image forming apparatus 11A, so that a firmware piece stored in the corresponding flash ROM is rewritten to the transmitted firmware piece (step S1115) Also, the "sent" field in the job management table is marked (step S1117).

Following this, a judgment is performed as to whether the job transmission-impossible indication flag is "ON" or not (step S1119). If the job transmission-impossible indication flag is not "ON" ("No" in step S1119), the corresponding job (first job) is deleted from the job management table (step S1121), and the processing returns. If the job transmission-impossible indication flag is "ON" ("Yes" in step S1119), i.e., if transmission of only some of interrelated firmware pieces is completed, a judgment is performed as to whether transmission of all the other interrelated firmware pieces is completed or not (step S1123). This judgment is performed by referring to interrelation information in the "additional information" field and by referring to the "sent" field corresponding to each interrelated firmware rewrite job in the job management table. To be more specific, by referring to the interrelation information, it becomes clear whether all the interrelated firmware rewrite jobs are registered or not. By referring to the "sent" field, it becomes clear whether transmission of all the interrelated firmware pieces is completed or not. When the transmission of all the interrelated firmware pieces is completed ("Yes" in step S1123), all the corresponding jobs are deleted from the job management table (step S1125), the job transmission-impossible indication flag is set "OFF" (step S1127), and the processing returns. On the other hand, when transmission of at least one of the interrelated firmware pieces is not completed ("No" in step S1123), steps S1125 and S1127 are skipped, and the processing returns.

When the type of the job is a print job ("No" in step S1105 and "Yes" in step S1129), the print job is read from the disk unit 205 by referring to an address stored in the job management table (step S1131). Based on the read print job, bitmap data (image data) is generated (step S1131). The generated image data is transmitted to the image forming apparatus 11A, and the image forming apparatus 11A is instructed to execute the print job (step S1135).

When the type of the job is a scan job ("No" in steps S1105 and S1139), scan data including an IP address of a client job that has given the scan request etc., is read (step S1139), and the image forming apparatus 11A is instructed to execute the scan job (step S1141).

When the type of the job is either a print job, or a scan job, the "sent" field corresponding to the job (first job) is marked (step S1137) upon completion of transmission of the job to the image forming apparatus 11A or of transmission of an instruction to execute the job to the image forming apparatus 11A. The job is then deleted from the job management table (step S1121).

When the job transmission-impossible indication flag is "ON" in step S1101, the job management table is searched, from the first line, for an interrelated firmware piece that is yet to be transmitted. When such an interrelated firmware piece is found ("Yes" in step S1143), the processing advances to step S1111, where a transmission process of the firmware rewrite job is executed. When such an interrelated firmware piece is not found ("No" in step S1143), the processing returns. The above processing aims to prohibit execution of other jobs (image processing jobs), once rewrite to one of interrelated firmware pieces is started.

In the above-described job transmission process, for example, the registration state of the job management table shown in FIG. 28A is changed to the registration state shown in FIG. 28B in which a firmware rewrite job relating to the third interrelated firmware piece in FIG. 28A has been moved to the first line as the job transmission processing advances. Once execution of this firmware rewrite job is started, execution of image processing jobs received thereafter (with job numbers 2, 3, 5, 7, and 8 in FIG. 28B) is suspended (prohibited) until execution of all the other interrelated firmware rewrite jobs (firmware rewrite jobs with job numbers 4, 6, and 9 in FIG. 28B) is completed.

When execution of all the interrelated firmware rewrite jobs is completed (the "sent" field is marked with "○" as shown in FIG. 28B) and these firmware rewrite jobs are deleted altogether from the job management table (FIG. 28C), the job execution process returns to normal for sequentially executing jobs from a job registered at the first line.

Figure 30:
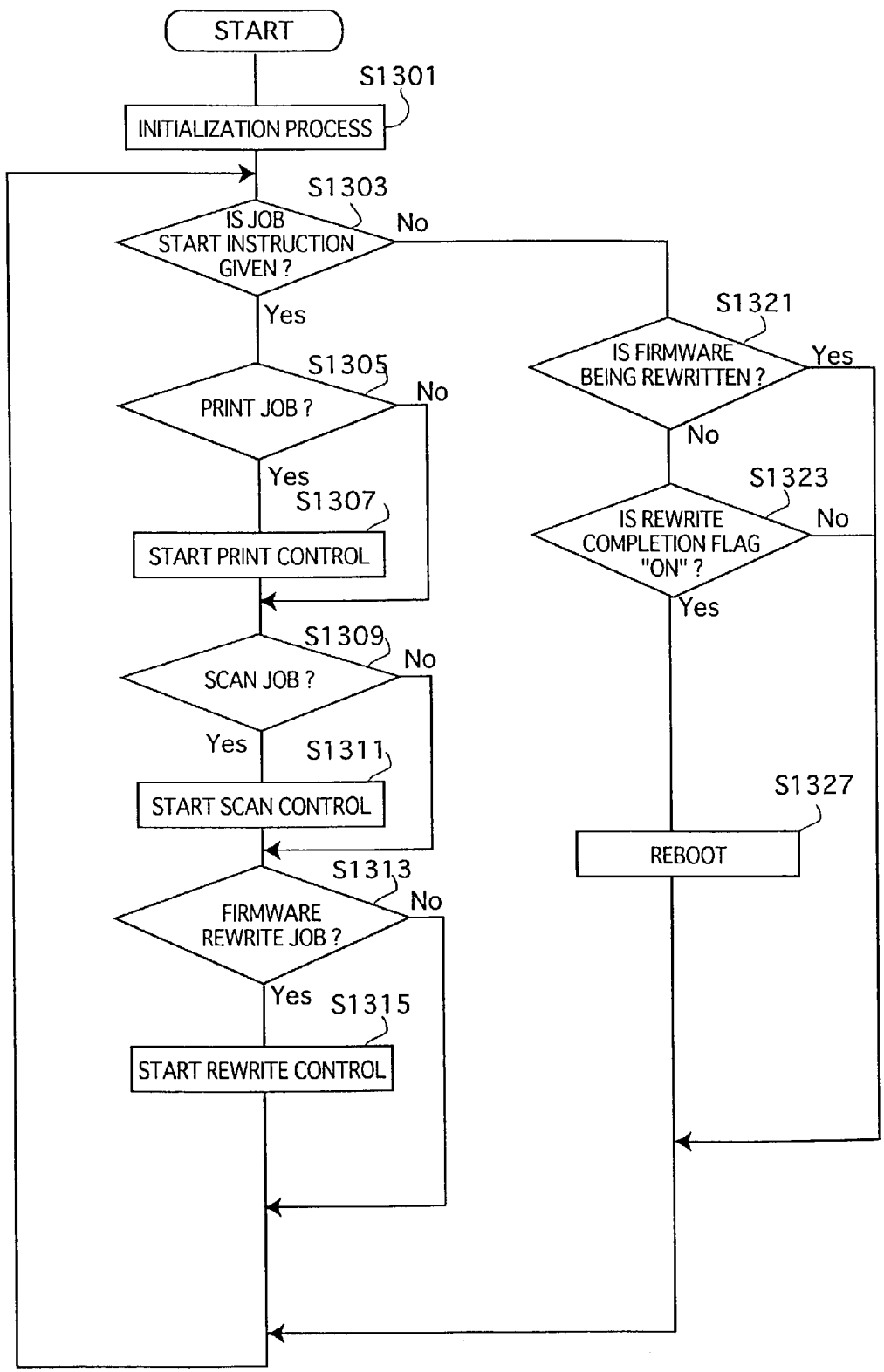
FIG. 30 is a flowchart showing a basic process executed by the image forming apparatus relating to the third embodiment.

FIG. 30 is a flowchart showing a basic process executed by the CPU 111 of the control module 1 in the image forming apparatus 11A, and corresponds to the flowchart shown in FIG. 25 in the second embodiment. In the third embodiment, unlike in the second embodiment, the image forming apparatus does not execute a firmware rewrite job and another job in parallel as described above, but executes one job at a time. Accordingly, the flowchart shown in FIG. 30 is the flowchart in FIG. 25 from which a process relating to parallel execution of jobs (steps S1326 and S1329) has been removed. Except this, the process in FIG. 30 is the same as the process in FIG. 25 in the second embodiment, and so steps that are the same as the steps shown in the flowchart in FIG. 25 are given the same step numbers and are not described here.

As described above, according to the third embodiment, once rewrite to one of interrelated firmware pieces is executed, execution of a subsequent image processing job, such as a scan job and a print job, is prohibited until rewrite to all the other interrelated firmware pieces is completed. As a result, it is ensured that an image processing job is prevented from being incompletely executed.

Here, although the above embodiment describes the case where there are four interrelated firmware pieces, there may be three or two interrelated firmware pieces. This is because a firmware piece to be incorporated in one control module is not necessarily interrelated to a firmware piece to be incorporated in each of the other control modules.

Also, it should be clear that the order in which interrelated firmware pieces are distributed is not necessarily the order of the serial numbers given to the interrelated firmware pieces.

Further, the third embodiment describes the case where an image forming apparatus is rebooted every time when a firmware piece is rewritten. In a case where there are interrelated firmware pieces, however, the image forming apparatus may be rebooted after rewrite to all the interrelated firmware pieces is completed. This is because an image processing job is not executed until execution of all the interrelated firmware rewrite jobs is completed. A timing of the rebooting is controlled by a printer controller regardless of whether a firmware piece is an interrelated firmware piece or not. To be more specific, the printer controller instructs the image forming apparatus to be rebooted either when rewrite to a firmware piece that is not an interrelated firmware piece is completed, or when rewrite to all interrelated firmware pieces is completed.

Although the present invention is described based on the above embodiments, it should be clear that the present invention is not be limited to the above embodiments. For example, the following modifications are possible.

(1) Although the above embodiments describe the case where a printer controller and an image processing apparatus are separately provided, the printer controller may be built in the image forming apparatus to form one integrated construction.

(2) In the case of (1), the control module 1 (CPU 111) is not provided, and the processing executed by the control module 1 may be executed by the printer controller (CPU 201).

(3) Although the above embodiments describe the case where the control part of the image forming apparatus is composed of four control modules (control units), the number of control modules (control units) constituting the control part should not be limited to such. Two, three, or five control modules may constitute the control part. Alternatively, only one control module may be provided in the case of the first embodiment.

(4) In relation to (3), the maximum number of interrelated firmware pieces in the third embodiment differs depending on the number of control modules (control units). To be more specific, the number of interrelated firmware pieces is at least two and not more than the number of the control modules (control units).

(5) Although the first embodiment describes the case where a program firmware piece (program firmware part) and a control firmware piece (control firmware part) are stored in separate flash ROMs and a firmware piece for a rewrite purpose is distributed from the service center with being categorized either as a program firmware piece or a parameter firmware piece, the present invention should not be limited to this case. A firmware piece may be composed of a program part and a control parameter part and may be stored in one flash ROM as an integration of the program part and the control parameter part. In this case, a firmware piece for a rewrite purpose is not categorized as a program firmware piece or a parameter firmware piece, but it is be distributed from the service center as an integration of a program part and a control parameter part. Here, in such a case where both an image processing job and a firmware rewrite job are placed in an execution queue, the execution order may be adjusted in such a manner that the image processing job precedes the firmware rewrite job, regardless of the reception order. By doing so, occurrence of such a case where an image processing job is delayed long due to execution of a firmware rewrite job can be reduced.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image processing apparatus, comprising:
a memory storing a piece of firmware;
a job reception unit for receiving an image processing job;
an image processing job execution controller for executing the image processing job using the piece of firmware
a firmware reception unit for receiving a piece of firmware for a rewrite purpose distributed from an external device;
a firmware rewrite controller for executing a firmware rewrite job of rewriting the piece of firmware stored in the memory to the received piece of firmware;
a judgment unit for judging a type of the received piece of firmware; and
a job management controller for, when the image processing job and the firmware rewrite job are both placed in a wait state for execution,
(a) adjusting an execution order of the image processing job and the firmware rewrite job when the type of the received piece of firmware pertains to program firmware, and
(b) instructing the image processing job execution controller and the firmware rewrite controller to respectively execute the image processing job and the firmware rewrite job in the adjusted execution order,
wherein the type of the received piece of firmware is one of program firmware and parameter firmware,
the judgment unit judges whether the type of the received piece of firmware is parameter firmware or program firmware, and
the job management controller adjusts the execution order based on the type of firmware.

2. The image processing apparatus of claim 1,
wherein the job management controller adjusts the execution order in such a manner that the program firmware rewrite job comes after the image processing job, when the judgment unit judges that the type of the received piece of firmware is program firmware.

3. The image processing apparatus of claim 1,
wherein the job management controller adjusts the execution order in such a manner that the parameter firmware rewrite job comes before the image processing job, when the judgment unit judges that the type of the received piece of firmware is parameter firmware.

4. The image processing apparatus of claim 1,
wherein the job reception unit receives a plurality of kinds of image processing jobs,
the job execution controller includes a plurality of control units and executes an image processing job by selectively utilizing at least one of the control units according to a kind of the image processing job,
the judgment unit judges which one of the plurality of control units is to use the received piece of firmware, and
a piece of firmware is distributed as being intended for one of the plurality of control units,
the job management controller instructs to execute the image processing job and the firmware rewrite job in parallel, when the image processing job and the firmware rewrite job are both placed in a wait state for execution and the control unit that is judged to use the received piece of firmware is not involved in execution of the image processing job.

5. The image processing apparatus of claim 1,
wherein the job execution controller includes a plurality of control units,
a piece of firmware is distributed as being intended for one of the plurality of control units,
a piece of firmware distributed includes one of at least two pieces of firmware that are interrelated with each other, where normal execution of a subsequent image processing job is disabled from when rewrite to one of the at least two pieces of firmware is started until when rewrite to all of the at least two pieces of firmware is completed, the judgment unit judges which one of the plurality of control units is to use the received piece of firmware, and judges whether a piece of firmware that is interrelated with the received piece of firmware is present or not, and once the job management controller instructs to execute a firmware rewrite job of rewriting to a piece of firmware that has pieces of firmware interrelated therewith, the job management controller prohibits execution of the image processing job until execution of firmware rewrite jobs of rewriting to the interrelated pieces of firmware is completed.

6. The image processing apparatus of claim 1,
wherein the image processing apparatus is connected to the Internet, and
the piece of firmware is distributed as being attached to an e-mail message, via the Internet.

7. The image processing apparatus of claim 1,
wherein the image processing apparatus includes a printer, and
the image processing job includes a print job.

8. A management unit for an image forming apparatus that includes an image processing job execution controller, the image processing job execution controller executing an image processing job using a piece of firmware stored in a memory, the management unit comprising:
a job reception unit for receiving an image processing job;
a firmware reception unit for receiving a piece of firmware for a rewrite purpose distributed from an external device;
a firmware rewrite instruction controller for instructing to execute a firmware rewrite job of rewriting the piece of firmware stored in the memory to the received piece of firmware;
a judgment unit for judging a type of the received piece of firmware;
a job management controller for, when the image processing job and the firmware rewrite job are both placed in a wait state for execution,
(a) adjusting an execution order of the image processing job and the firmware rewrite job when the type of the received piece of firmware pertains to program firmware, and
(b) instructing the image forming apparatus to execute the image processing job and the firmware rewrite job in the adjusted execution order,
wherein the type of the received niece of firmware is one of program firmware and parameter firmware,
the judgment unit judges whether the type of the received piece of firmware is parameter firmware or program firmware, and
the job management controller adjusts the execution order based on the type of firmware.

9. The management unit of claim 8,
wherein the job management controller adjusts the execution order in such a manner that the program firmware rewrite job comes after the image processing job, when the judgment unit judges that the type of the received piece of firmware is program firmware.

10. The management unit of claim 8,
wherein the job management controller adjusts the execution order in such a manner that the parameter firmware rewrite job comes before the image processing job, when the judgment unit judges that the type of the received piece of firmware is parameter firmware.

11. The management unit of claim 8,
wherein the image processing apparatus is connected to the Internet, and
the piece of firmware is distributed as being attached to an e-mail message, via the Internet.

12. A computer readable medium storing a program, to be executed in an image processing apparatus or a management unit for an image forming apparatus, the image processing apparatus and the management unit for the image forming apparatus each including a controller executing an image processing job using a piece of firmware stored in a memory, the program comprising;
a first step of receiving an image processing job;
a second step of receiving a piece of firmware for a rewrite purpose distributed from an external device;
a third step of judging a type of the received piece of firmware; and
a fourth step of adjusting an execution order of the image processing job and the firmware rewrite job when the type of the received piece of firmware judged in the third step pertains to program firmware, and when the image processing job and a firmware rewrite job of rewriting the piece of firmware stored in the memory to the received piece of firmware are both placed in a wait state for execution
wherein the type of the received piece of firmware is one of program firmware and parameter firmware,
in the third step, a judgment is performed as to whether the type of the received piece of firmware is parameter firmware or program firmware, and
in the fourth step, the execution order is adjusted based on the type of firmware.

13. The program of claim 12,
wherein in the fourth step, the execution order is adjusted in such a manner that the program firmware rewrite job comes after the image processing job, when a judgment result in the third step shows that the type of the received piece of firmware is program firmware.

14. The program of claim 12,
wherein in the fourth step, the execution order is adjusted in such a manner that the parameter firmware rewrite job comes before the image processing job, when a judgment result in third step shows that the type of the received piece of firmware is parameter firmware.

15. The program of claim 12,
wherein in the second step, the piece of firmware is distributed as being attached to an e-mail message via the Internet.

16. An image processing apparatus, comprising:
a memory storing a piece of firmware;
a job reception unit for receiving an image processing job;
an image processing job execution controller for executing the image processing job using the piece of firmware;
a firmware reception unit for receiving a piece of firmware for a rewrite purpose distributed from an external device;
a firmware rewrite controller for executing a firmware rewrite job of rewriting the piece of firmware stored in the memory to the received piece of firmware; and
a job management controller for, when the image processing job and the firmware rewrite job are both placed in a wait state for execution,
(a) adjusting an execution order of the image processing job and the firmware rewrite job in such a manner that the image processing job comes before the firmware rewrite job when the firmware rewriting job pertains to program firmware, and (b) instructing the image processing job execution controller and the firmware rewrite controller to respectively execute the image processing job and the firmware rewrite job in the adjusted execution order, wherein the type of the received piece of firmware is one of program firmware and parameter firmware, the job management controller determines whether the type of the received piece of firmware is parameter firmware or program firmware, and the job management controller adjusts the execution order based on the type of firmware.

* * * * *